(12) United States Patent
Wu

(10) Patent No.: US 12,146,645 B2
(45) Date of Patent: Nov. 19, 2024

(54) ILLUMINATION DEVICE AND PROJECTION DEVICE

(71) Applicant: Coretronic Corporation, Hsin-Chu (TW)

(72) Inventor: Chia-Cheng Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/402,759

(22) Filed: Jan. 3, 2024

(65) Prior Publication Data

US 2024/0230078 A1    Jul. 11, 2024

(30) Foreign Application Priority Data

Jan. 5, 2023   (CN) .......................... 202310013199.0

(51) Int. Cl.
| | |
|---|---|
| *F21V 29/71* | (2015.01) |
| *F21V 29/503* | (2015.01) |
| *F21Y 115/10* | (2016.01) |
| *H04N 9/31* | (2006.01) |

(52) U.S. Cl.
CPC .......... *F21V 29/717* (2015.01); *F21V 29/503* (2015.01); *H04N 9/3144* (2013.01); *H04N 9/3164* (2013.01); *F21Y 2115/10* (2016.08)

(58) Field of Classification Search
CPC ... F21V 29/717; F21V 29/503; H04N 9/3144; H04N 9/3164
See application file for complete search history.

(56) References Cited

U.S. PATENT DOCUMENTS

| | | | |
|---|---|---|---|
| 5,884,691 A | 3/1999 | Batchelder | |
| 6,986,582 B2 | 1/2006 | Kobayashi | |
| 10,969,667 B2 * | 4/2021 | Liu ...................... | H04N 9/3144 |
| 11,029,588 B2 * | 6/2021 | Sugiyama ............ | G03B 21/005 |

(Continued)

FOREIGN PATENT DOCUMENTS

| | | |
|---|---|---|
| CN | 101655656 B | 5/2011 |
| CN | 207354792 U | 5/2018 |

(Continued)

OTHER PUBLICATIONS

The first Office Action, dated May 21, 2024, in counterpart Taiwan Application No. 112100390.

(Continued)

*Primary Examiner* — Bryon T Gyllstrom

(57) ABSTRACT

An illumination device includes a first heat source, a second heat source, a third heat source, a first porous heat dissipation element, a second porous heat dissipation element, a third porous heat dissipation element, a first guide pipe, and a second guide pipe. The first porous heat dissipation element is connected to the first heat source, the second porous heat dissipation element is connected to the second heat source, and the third porous heat dissipation element is connected to the third heat source. The first guide pipe is connected to the first porous heat dissipation element and the third porous heat dissipation element, and the second guide pipe is connected to the second porous heat dissipation element and the third porous heat dissipation element. The disclosure also provides a projection device with the aforementioned illumination device.

19 Claims, 18 Drawing Sheets

(56) References Cited

U.S. PATENT DOCUMENTS

| | | | | |
|---|---|---|---|---|
| 2008/0117637 A1* | 5/2008 | Chang | .................. | F21V 29/717 |
| | | | | 165/182 |
| 2010/0045940 A1* | 2/2010 | Takagi | .................. | G03B 21/16 |
| | | | | 353/54 |
| 2019/0242569 A1* | 8/2019 | Jiang | ....................... | F21K 9/237 |
| 2020/0073217 A1* | 3/2020 | Shimizu | ................ | F28D 15/046 |
| 2020/0133107 A1* | 4/2020 | Takagi | ............... | H05K 7/20327 |
| 2020/0272038 A1* | 8/2020 | Sugiyama | ........... | F28D 15/0266 |

FOREIGN PATENT DOCUMENTS

| | | | |
|---|---|---|---|
| CN | 104949080 | B | 10/2018 |
| CN | 209763829 | U | 12/2019 |
| CN | 110703556 | A | 1/2020 |
| CN | 111752078 | A | 10/2020 |
| CN | 212463902 | U | 2/2021 |
| CN | 113156748 | A | 7/2021 |
| CN | 114779562 | A | 7/2022 |
| TW | 444877 | U | 7/2001 |
| TW | I591419 | B | 7/2017 |
| TW | I778817 | B | 9/2022 |
| WO | 2021179768 | A1 | 9/2021 |

OTHER PUBLICATIONS

Lee, Wei-Yi et al., "Projection Device", U.S. Appl. No. 18/495,765, filed Oct. 27, 2023.

* cited by examiner

ILLUMINATION DEVICE AND PROJECTION DEVICE

CROSS-REFERENCE TO RELATED APPLICATION

This application claims the priority benefit of China application (No. 202310013199.0), filed on Jan. 5, 2023. The entirety of the above-mentioned patent application is hereby incorporated by reference herein and made a part of this specification.

TECHNICAL FIELD

The disclosure relates to an imaging device, and more particularly to an illumination device with a heat dissipation effect and a projection device having the illumination device.

BACKGROUND

The light source used in a projection device has evolved from a UHP lamp, light emitting diode (LED) to a laser diode (LD) with the requirements of the market for the brightness, color saturation, service life, non-toxic and environmental protection of the projection device. In general, the various light sources generate a large amount of thermal energy during the operation of the projection device, so most conventional projection devices are equipped with heat dissipation elements to dissipate heat from the light source. In addition, the light-emitting diode or laser diode light source usually includes a plurality of light sources with different light-emitting wavelengths, and the heat dissipation efficiency required by each light source is slightly different.

However, because most of the conventional heat dissipation elements use fins as the heat dissipation medium and the heat dissipation area of fins is limited, the conventional heat dissipation elements must have a large volume to provide sufficient heat dissipation efficiency. Therefore, the conventional heat dissipation components often occupy too much space within the projection device and the illumination device, making it difficult for the conventional heat dissipation components to be flexibly arranged according to the heat dissipation needs of different light sources.

The information disclosed in this "BACKGROUND" section is only for enhancement understanding of the background and therefore it may contain information that does not form the prior art that is already known to a person of ordinary skill in the art. Furthermore, the information disclosed in this "BACKGROUND" section does not mean that one or more problems to be solved by one or more embodiments of the disclosure were acknowledged by a person of ordinary skill in the art.

SUMMARY

The disclosure provides an illumination device to improve the heat dissipation efficiency of the heat source of the illumination device in a limited space.

The disclosure provides a projection device to enhance durability and image quality.

Other advantages and objectives of the disclosure may be further illustrated by the technical features broadly embodied and described as follows.

In order to achieve one or a portion of or all of the objectives or other objectives, the illumination device provided by the disclosure includes a first heat source, a second heat source, a third heat source, a first porous heat dissipation element, a second porous heat dissipation element, a third porous heat dissipation element, a first guide pipe, and a second guide pipe. The first porous heat dissipation element is connected to the first heat source and has a first ventilation side, a second ventilation side, and a plurality of first flow channels. The first ventilation side is opposite to the second ventilation side. The first flow channels extend from the first ventilation side to the second ventilation side. The second porous heat dissipation element is connected to the second heat source and has a third ventilation side, a fourth ventilation side, and a plurality of second flow channels. The third ventilation side is opposite to the fourth ventilation side. The second flow channels extend from the third ventilation side to the fourth ventilation side. The third porous heat dissipation element is connected to the third heat source and has a fifth ventilation side, a sixth ventilation side, and a plurality of third flow channels. The fifth ventilation side is opposite to the sixth ventilation side. The third flow channels extend from the fifth ventilation side to the sixth ventilation side. The first guide pipe is connected to the second ventilation side and the fifth ventilation side and is communicated to the first flow channels and the third flow channels. The second guide pipe is connected to the fourth ventilation side and the sixth ventilation side and is communicated to the second flow channels and the third flow channels.

In an embodiment of the disclosure, the first porous heat dissipation element further has a plurality of first sidewalls. The first sidewalls are located between the first ventilation side and the second ventilation side. The second porous heat dissipation element further has a plurality of second sidewalls. The second sidewalls are located between the third ventilation side and the fourth ventilation side. The third porous heat dissipation element further has a plurality of third sidewalls. The third sidewalls are located between the fifth ventilation side and the sixth ventilation side.

In an embodiment of the disclosure, the first porous heat dissipation element is opposite to the second porous heat dissipation element. The third porous heat dissipation element is located between the first porous heat dissipation element and the second porous heat dissipation element. The third porous heat dissipation element further has a third sidewall and a seventh ventilation side opposite to each other. The third sidewall and the seventh ventilation side are connected between the fifth ventilation side and the sixth ventilation side. The seventh ventilation side has a plurality of ventilation openings. The ventilation openings are communicated with the third flow channels.

In an embodiment of the disclosure, the third porous heat dissipation element further has a fourth sidewall and a fifth sidewall opposite to each other. The fourth sidewall and the fifth sidewall are connected between the fifth ventilation side and the sixth ventilation side and connected to the third sidewall and the seventh ventilation side to form an airflow space. The ventilation openings include a plurality of ventilation gaps. A width of the ventilation gap is smaller than a width of the third flow channel in a direction from the fourth sidewall to the fifth sidewall.

In an embodiment of the disclosure, the third sidewall has a first surface and a second surface opposite to each other. The third heat source is arranged on the first surface. The fifth ventilation side, the sixth ventilation side, and the third flow channels are located on all or part of the second surface.

In an embodiment of the disclosure, the third flow channels are located on part of the second surface. The third porous heat dissipation element includes a first heat dissipation block and a second heat dissipation block. The fifth ventilation side and part of the third flow channels are located in the first heat dissipation block. The sixth ventilation side and another part of the third flow channels are located in the second heat dissipation block. The first heat dissipation block and the second heat dissipation block are separated from each other in a direction from the fifth ventilation side to the sixth ventilation side.

In an embodiment of the disclosure, the aforementioned illumination device further includes a fan, arranged on the first ventilation side, the third ventilation side, and/or the seventh ventilation side.

In an embodiment of the disclosure, the aforementioned illumination device further includes a third guide pipe. The fan is at least arranged on the seventh ventilation side, and the third guide pipe is communicated with the fan and the ventilation openings.

In an embodiment of the disclosure, the first heat source, the second heat source, and the third heat source each include a light source, and the light source of the third heat source is configured to generate a green beam.

In an embodiment of the disclosure, the aforementioned illumination device further includes a fan, arranged on the first ventilation side and/or the third ventilation side.

In an embodiment of the disclosure, the first heat source, the second heat source, and the third heat source each include a light source.

In an embodiment of the disclosure, the first guide pipe and the second guide pipe each have a bending part. The bending part has a plurality of heat dissipation fins. The heat dissipation fins are arranged to penetrate the respective bending part.

In an embodiment of the disclosure, shapes of the first flow channel, the second flow channel, and the third flow channel include cylindrical or hexagonal columns.

In an embodiment of the disclosure, the first flow channels are distributed within all the first porous heat dissipation element. The second flow channels are distributed within all the second porous heat dissipation element. The third flow channels are distributed within all the third porous heat dissipation element.

In an embodiment of the disclosure, the aforementioned illumination device further includes a heat dissipation layer. The heat dissipation layer is arranged in all the first flow channels, all the second flow channels, and all the third flow channels, or in some of the first flow channels, some of the second flow channels, and some of the third flow channels.

In an embodiment of the disclosure, materials of the first guide pipe and the second guide pipe include metal or plastic.

In an embodiment of the disclosure, the aforementioned illumination device further includes a first heat conductive member, a second heat conductive member, a third heat conductive member, and a heat conductive layer. The first heat conductive member is fixed to the first porous heat dissipation element. The second heat conductive member is fixed to the second porous heat dissipation element. The third heat conductive member is fixed to the third porous heat dissipation element. The heat conductive layer is arranged between the first heat conductive member and the first porous heat dissipation element, between the second heat conductive member and the second porous heat dissipation element, and between the third heat conductive member and the third porous heat dissipation element.

In an embodiment of the disclosure, volumes of the first flow channels are different from each other, volumes of the second flow channels are different from each other, and volumes of the third flow channels are different from each other.

In an embodiment of the disclosure, the projection device includes an illumination device, a display element, and a projection lens. The illumination device is configured to provide an illumination beam. The illumination device includes a first heat source, a second heat source, a third heat source, a first porous heat dissipation element, a second porous heat dissipation element, a third porous heat dissipation element, a first guide pipe, and a second guide pipe. The first porous heat dissipation element is connected to the first heat source and has a first ventilation side, a second ventilation side, and a plurality of first flow channels. The first ventilation side is opposite to the second ventilation side. The first flow channels extend from the first ventilation side to the second ventilation side. The second porous heat dissipation element is connected to the second heat source and has a third ventilation side, a fourth ventilation side, and a plurality of second flow channels. The third ventilation side is opposite to the fourth ventilation side. The second flow channels extend from the third ventilation side to the fourth ventilation side. The third porous heat dissipation element is connected to the third heat source and has a fifth ventilation side, a sixth ventilation side, and a plurality of third flow channels. The fifth ventilation side is opposite to the sixth ventilation side. The third flow channels extend from the fifth ventilation side to the sixth ventilation side. The first guide pipe is connected to the second ventilation side and the fifth ventilation side and is communicated to the first flow channels and the third flow channels. The second guide pipe is connected to the fourth ventilation side and the sixth ventilation side and is communicated to the second flow channels and the third flow channels. The display element is located on a transmission path of the illumination beam and is configured to receive the illumination beam and convert the illumination beam into an image beam. The projection lens is located on a transmission path of the image beam and is configured to project the image beam out of the projection device.

The illumination device of the disclosure adopts a first porous heat dissipation element, a second porous heat dissipation element, and a third porous heat dissipation element to dissipate heat from the first heat source, the second heat source, and the third heat source, respectively. Specifically, because the first porous heat dissipation element, the second porous heat dissipation element, and the third porous heat dissipation element can provide sufficient heat dissipation area within a limited volume, the first porous heat dissipation element, the second porous heat dissipation element, and the third porous heat dissipation element can be arranged more flexibly according to the heat dissipation needs of the heat source. In addition, the first porous heat dissipation element and the third porous heat dissipation element are connected by a first guide pipe, while the second porous heat dissipation element and the third porous heat dissipation element are connected by a second guide pipe. Further, the first guide pipe and the second guide pipe can prevent the airflow from escaping between the first porous heat dissipation element, the second porous heat dissipation element, and the third porous heat dissipation element, thereby increasing the amount of the airflow flowing through the first porous heat dissipation element, the second porous heat dissipation element, and the third porous heat dissipation element. Therefore, the illumination device and the projection device of the disclosure can improve the heat dissipation efficiency of the heat source in a limited space, and thus improve the durability and image quality of the projection device.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the disclosure may be practiced. In this regard, directional terminology, such as "top", "bottom", "front", "back", etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
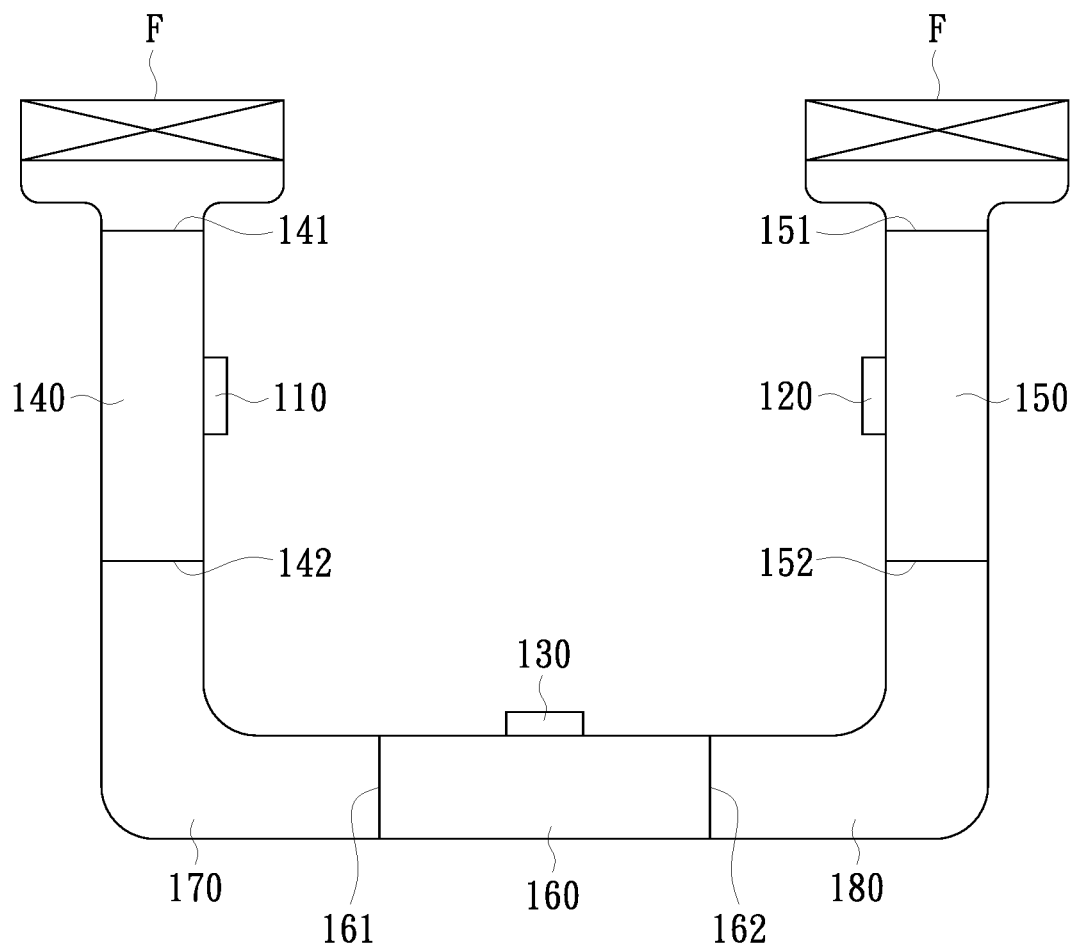
FIG. 1 is a schematic diagram of an illumination device according to an embodiment of the disclosure.
Figure 2:
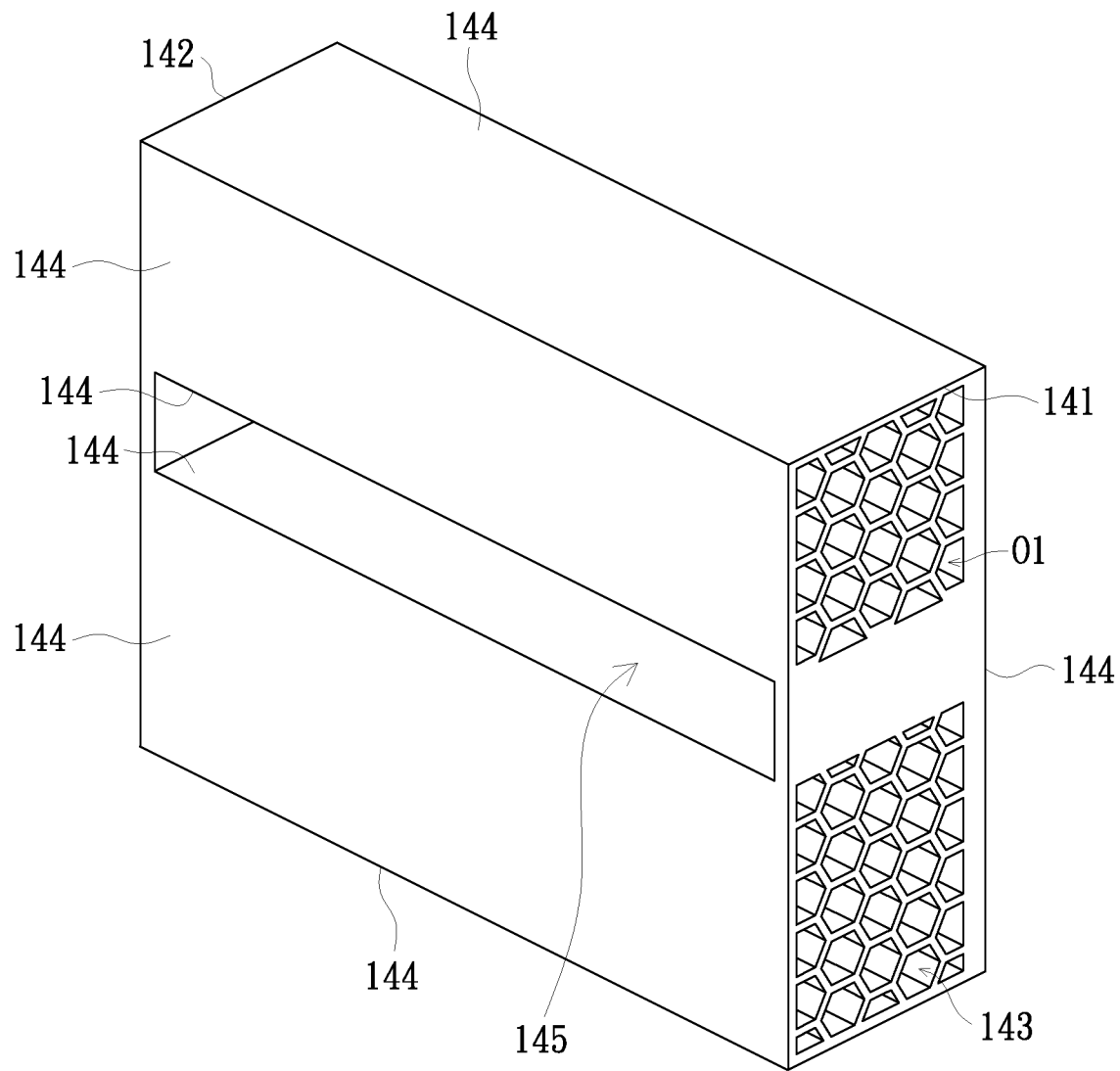
FIG. 2 is a three-dimensional schematic diagram of a first porous heat dissipation element in FIG. 1.
Figure 3:
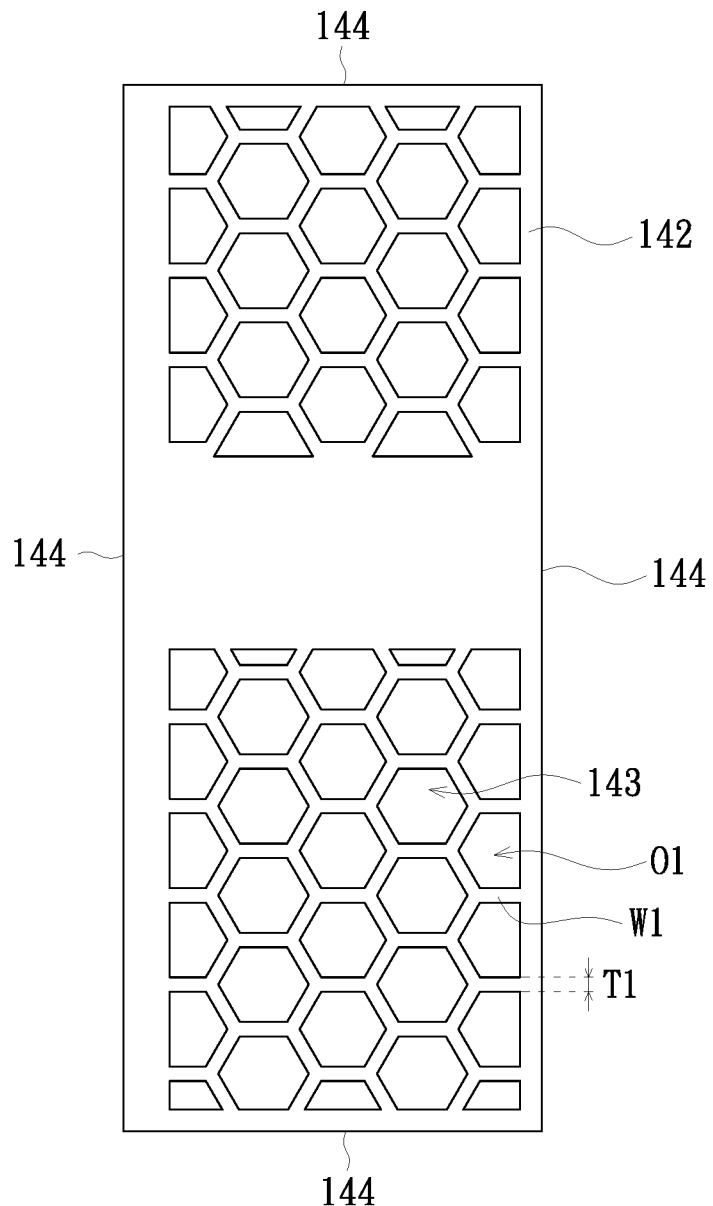
FIG. 3 is a schematic diagram of a second ventilation side of the first porous heat dissipation element of FIG. 2.
Figure 4:
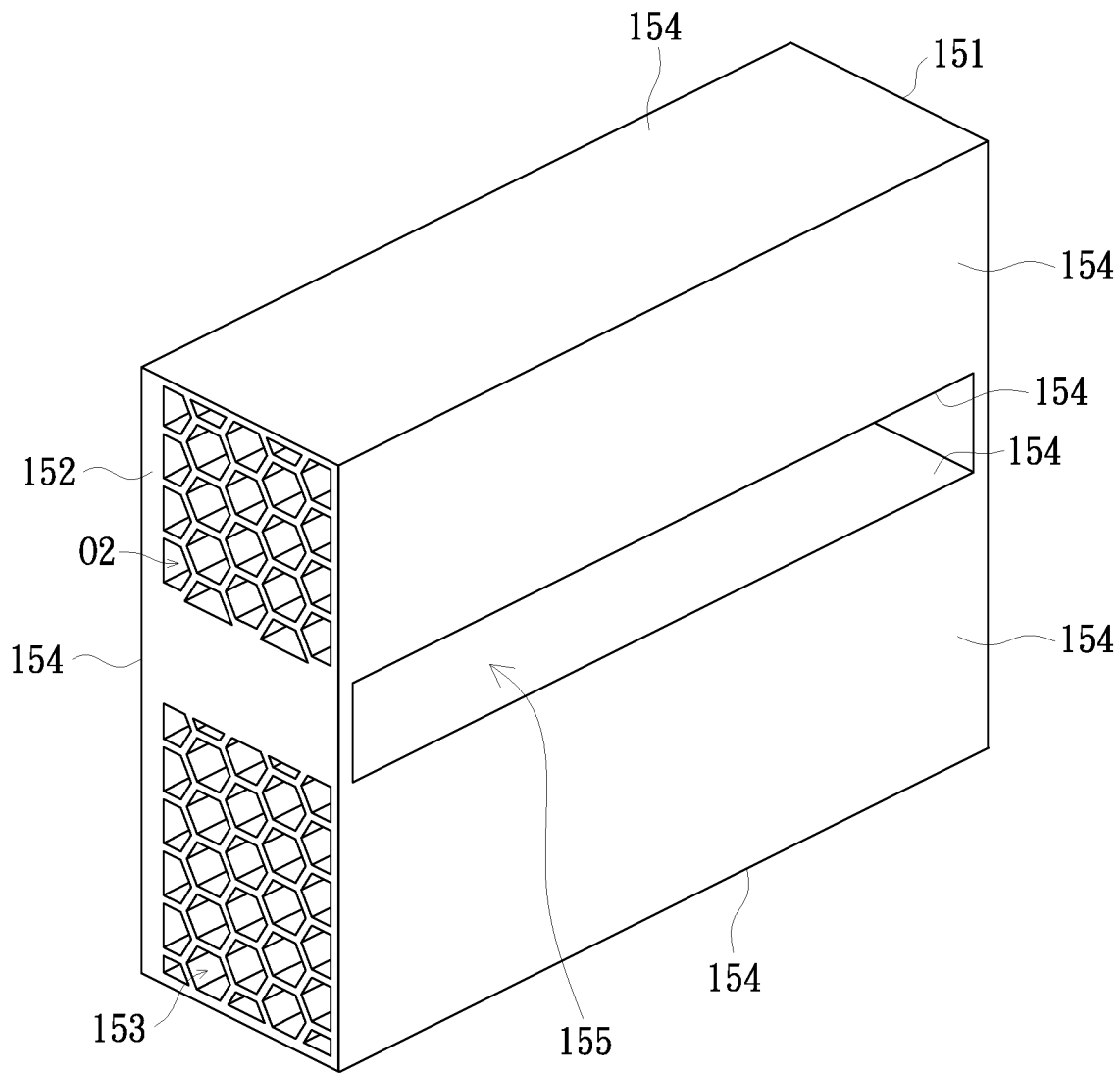
FIG. 4 is a three-dimensional schematic diagram of a second porous heat dissipation element in FIG. 1.
Figure 5:
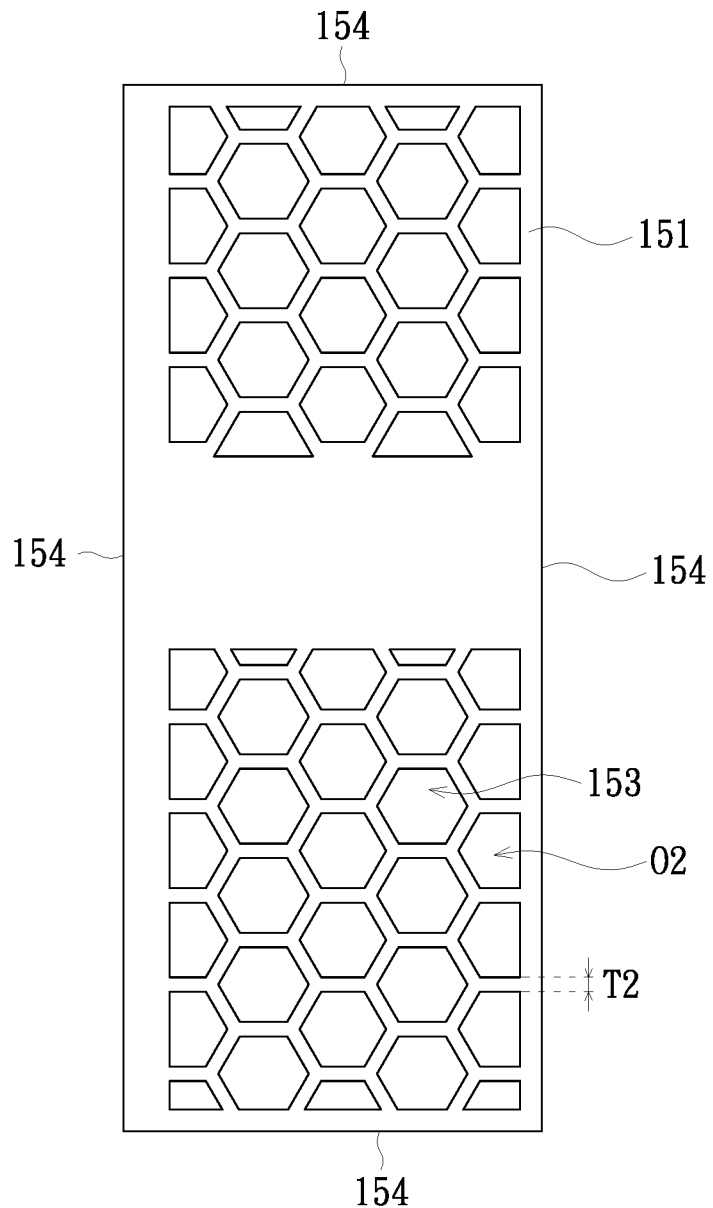
FIG. 5 is a schematic diagram of a third ventilation side of the second porous heat dissipation element of FIG. 4.
Figure 6:
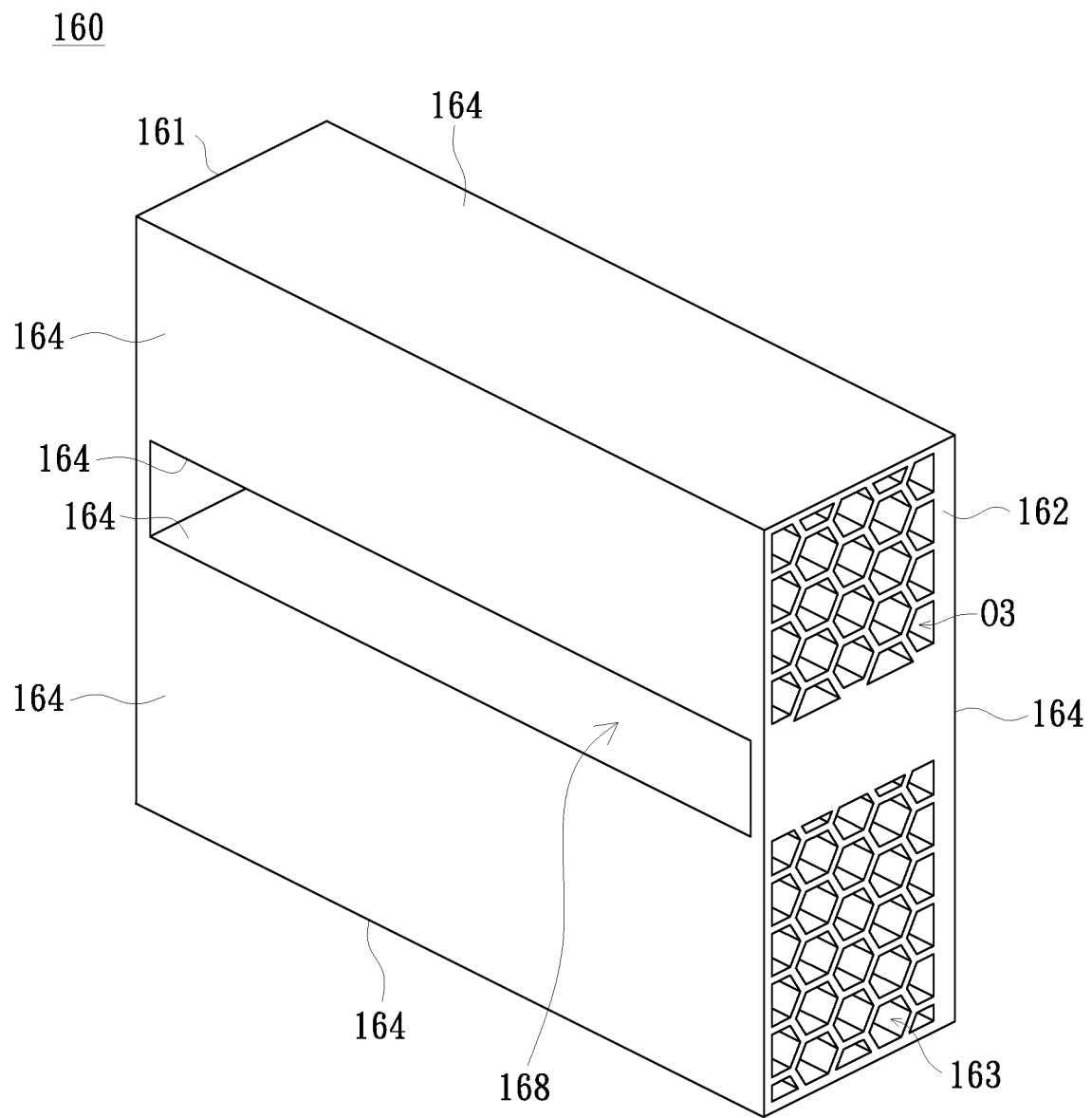
FIG. 6 is a three-dimensional schematic diagram of a third porous heat dissipation element in FIG. 1.
Figure 7:
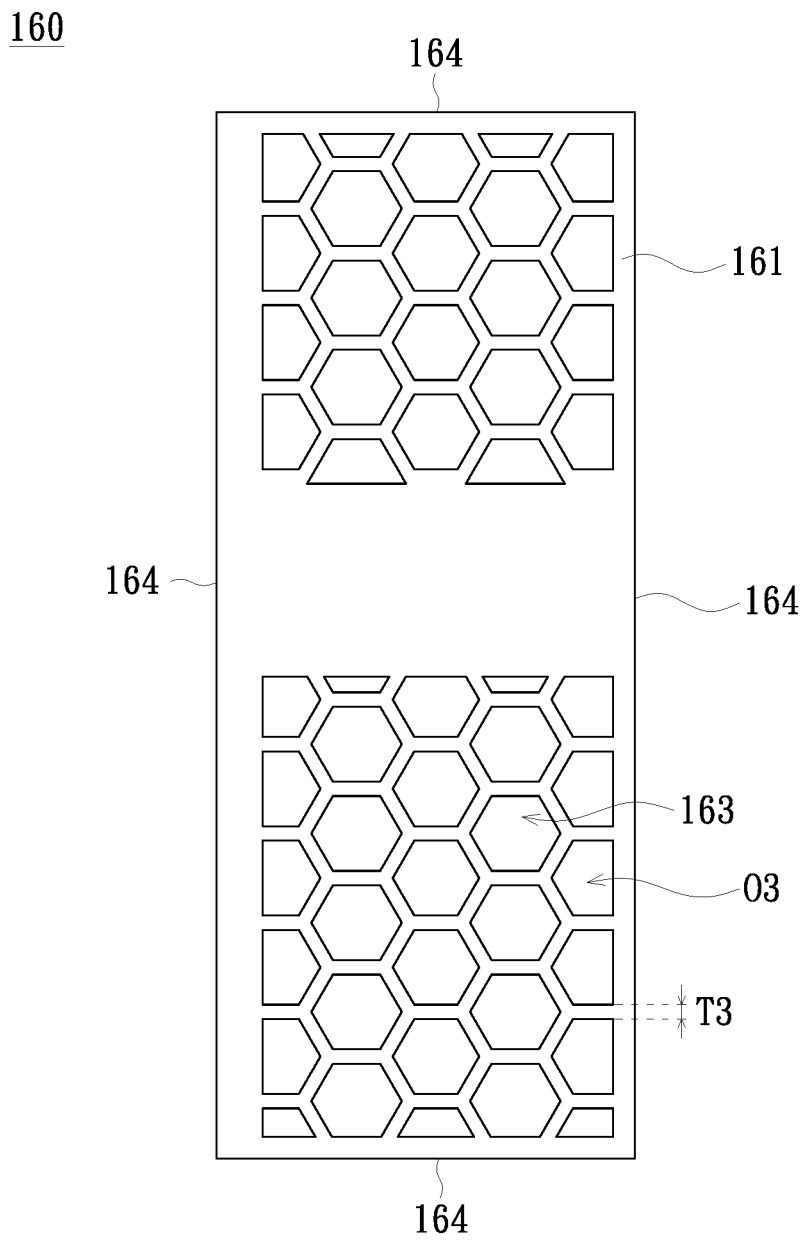
FIG. 7 is a schematic diagram of a fifth ventilation side of the third porous heat dissipation element of FIG. 6.

FIG. 1 is a schematic diagram of an illumination device according to an embodiment of the disclosure. FIG. 2 is a three-dimensional schematic diagram of a first porous heat dissipation element in FIG. 1. FIG. 3 is a schematic diagram of a second ventilation side of the first porous heat dissipation element of FIG. 2. FIG. 4 is a three-dimensional schematic diagram of a second porous heat dissipation element in FIG. 1. FIG. 5 is a schematic diagram of a third ventilation side of the second porous heat dissipation element of FIG. 4. FIG. 6 is a three-dimensional schematic diagram of a third porous heat dissipation element in FIG. 1. FIG. 7 is a schematic diagram of a fifth ventilation side of the third porous heat dissipation element of FIG. 6.

Please refer to FIG. 1 first. In this embodiment, the illumination device 100 includes a first heat source 110, a second heat source 120, a third heat source 130, a first porous heat dissipation element 140, a second porous heat dissipation element 150, a third porous heat dissipation element 160, a first guide pipe 170, and a second guide pipe 180. The first porous heat dissipation element 140 is connected to the first heat source 110, the second porous heat dissipation element 150 is connected to the second heat source 120, and the third porous heat dissipation element 160 is connected to the third heat source 130. Please refer to FIGS. 2 and 3 together. The first porous heat dissipation element 140 has a first ventilation side 141, a second ventilation side 142 (depicted in FIG. 3), and a plurality of first flow channels 143. The first ventilation side 141 and the second ventilation side 142 are opposite each other, and the first flow channel 143 extends from the first ventilation side 141 to the second ventilation side 142. Please refer to FIGS. 4 and 5 together. The second porous heat dissipation element 150 has a third ventilation side 151 (depicted in FIG. 5), a fourth ventilation side 152, and a plurality of second flow channels 153. The third ventilation side 151 and the fourth ventilation side 152 are opposite each other, and the second flow channel 153 extends from the third ventilation side 151 to the fourth ventilation side 152. Please refer to FIGS. 6 and 7 together. The third porous heat dissipation element 160 has a fifth ventilation side 161 (depicted in FIG. 7), a sixth ventilation side 162, and a plurality of third flow channels 163. The fifth ventilation side 161 and the sixth ventilation side 162 are opposite each other, and the third flow channel 163 extends from the fifth ventilation side 161 to the sixth ventilation side 162. As shown in FIG. 1, the first guide pipe 170 is connected to the second ventilation side 142 and the fifth ventilation side 161 and is communicated to the first flow channel 143 (depicted in FIG. 2) and the third flow channel 163 (depicted in FIG. 6). The second guide pipe 180 is connected to the fourth ventilation side 152 and the sixth ventilation side 162 and is communicated to the second flow channel 153 (depicted in FIG. 4) and the third flow channel 163. That is, the first porous heat dissipation element 140 is connected to the first heat source 110, the second porous heat dissipation element 150 is connected to the second heat source 120, and the third porous heat dissipation element 160 is connected to the third heat source 130. The first guide pipe 170 is connected between the first porous heat dissipation element 140 and the third porous heat dissipation element 160, while the second guide pipe 180 is connected between the second porous heat dissipation element 150 and the third porous heat dissipation element 160.

In this embodiment, the illumination device 100 further includes, for example, a fan F. The fan F is arranged on the first ventilation side 141 and/or the third ventilation side 151. In this embodiment, the fan F is located on the first ventilation side 141 and the third ventilation side 151 as an example. Specifically, the fan F can guide airflow to flow through the first porous heat dissipation element 140, the second porous heat dissipation element 150, the third porous heat dissipation element 160, the first guide pipe 170, and the second guide pipe 180. For example, the fan F can guide the airflow to flow through the first porous heat dissipation element 140, the first guide pipe 170, the third porous heat dissipation element 160, the second guide pipe 180, and the second porous heat dissipation element 150 in sequence, but the disclosure is not limited thereto. The airflow path can be determined by setting the airflow to flow in or flow out the fan F, that is, the fan F can also guide the airflow to flow through the second porous heat dissipation element 150, the second guide tube 180, the third porous heat dissipation element 160, the first guide tube 170, and the first porous heat dissipation element 140 in sequence. It is understood that the quantity of the fans F is not limited to that shown in FIG. 1. For example, the quantity of the fans F may be one in another embodiment, and the fan F may be located on the first ventilation side 141 or the second ventilation side 142. The quantity of the fans F can be determined based on factors such as heat dissipation demand and product cost, so the disclosure does not impose any further restrictions on this. Incidentally, the fan F of this embodiment may include an axial flow fan, but the fan F may include a drum fan (blower) in other embodiments.

In this embodiment, the first porous heat dissipation element 140, the second porous heat dissipation element 150, and the third porous heat dissipation element 160 can allow the airflow generated by the fan F to flow therethrough to provide the heat dissipation function. Please refer to FIGS. 2 and 3 again. The first porous heat dissipation element 140 may further have a plurality of first sidewalls 144. The first sidewalls 144 are located between the first ventilation side 141 and the second ventilation side 142. Specifically, the first flow channels 143 can form a plurality of openings O1 on the first ventilation side 141 and the second ventilation side 142 for the airflow generated by the fan F to flow therethrough. On the other hand, the first sidewalls 144 can prevent the airflow from flowing out from parts other than the first ventilation side 141 and the second ventilation side 142, so as to increase the amount of the airflow flowing through the first flow channels 143, thereby improving the heat dissipation efficiency. For example, the shape of the first flow channel 143 can be cylindrical, and the airflow generated by the fan F can flow along the axial direction of the first flow channel 143. The first sidewalls 144 can be arranged around the axial direction of the first flow channels 143 to prevent the airflow from flowing out radially along the first flow channels 143.

Please refer to FIGS. 4 and 5 together. Similarly, the second porous heat dissipation element 150 may further have a plurality of second sidewalls 154. The second sidewalls 154 are located between the third ventilation side 151 and the fourth ventilation side 152. Specifically, the second flow channels 153 can form a plurality of openings O2 on the third ventilation side 151 and the fourth ventilation side 152 for the airflow generated by the fan F to flow therethrough. On the other hand, the second sidewalls 154 can prevent the airflow from flowing out from parts other than the third ventilation side 151 and the fourth ventilation side 152, so as to increase the amount of the airflow flowing through the second flow channels 153, thereby improving the heat dissipation efficiency. For example, the shape of the second flow channel 153 can be cylindrical, and the airflow generated by the fan F can flow along the axial direction of the second flow channel 153. The second sidewalls 154 can be arranged around the axial direction of the second flow channels 153 to prevent the airflow from flowing out radially along the second flow channels 153.

Please refer to FIGS. 6 and 7 together. Similarly, the third porous heat dissipation element 160 may further have a plurality of third sidewalls 164. The third sidewalls 164 are located between the fifth ventilation side 161 and the sixth ventilation side 162. Specifically, the third flow channels 163 can form a plurality of openings O3 on the fifth ventilation side 161 and the sixth ventilation side 162 for the airflow generated by the fan F to flow therethrough. On the other hand, the third sidewalls 164 can prevent the airflow from flowing out from parts other than the fifth ventilation side 161 and the sixth ventilation side 162, so as to increase the amount of the airflow flowing through the third flow channels 163, thereby improving the heat dissipation efficiency. For example, the shape of the third flow channel 163 can be cylindrical, and the airflow generated by the fan F can flow along the axial direction of the third flow channel 163. The third sidewalls 164 can be arranged around the axial direction of the third flow channels 163 to prevent the airflow from flowing out radially along the third flow channels 163.

Figure 8:
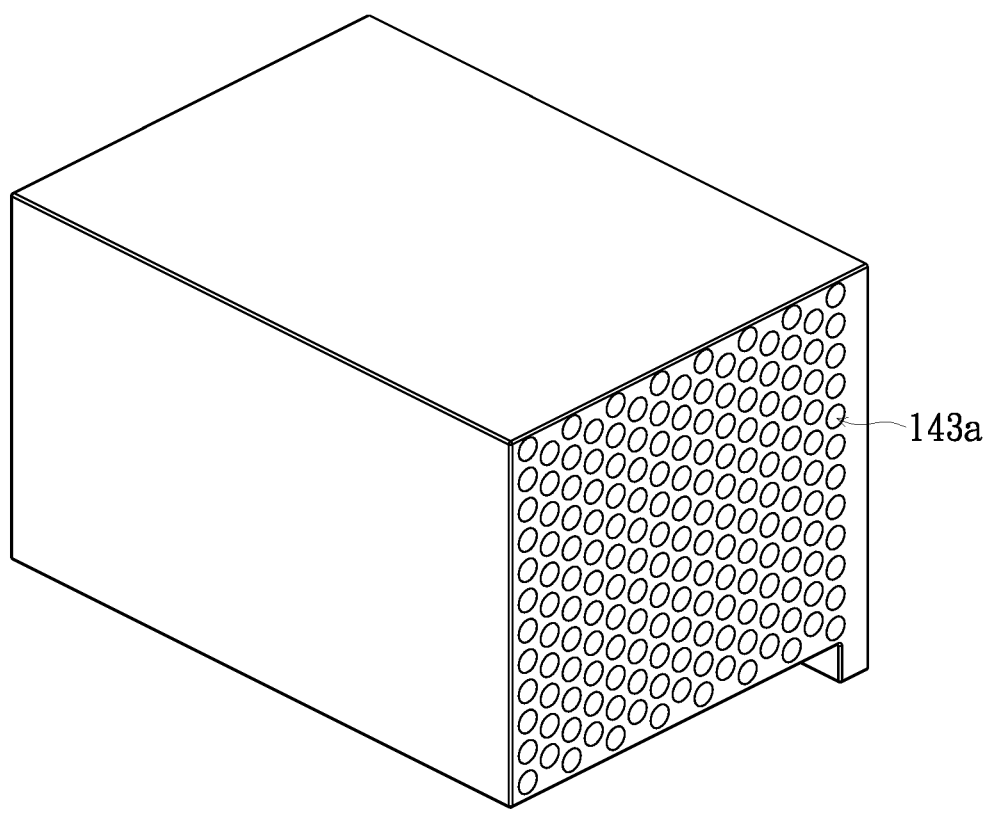
FIG. 8 is a three-dimensional schematic diagram of a first porous heat dissipation element in another embodiment of the disclosure.

As shown in FIGS. 2, 4, and 6, the shape of the first flow channel 143, the shape of the second flow channel 153, and the shape of the third flow channel 163 may include cylindrical or hexagonal columns, wherein FIGS. 2, 4 and 6 are examples of hexagonal columns. Furthermore, the first flow channel 143, the second flow channel 153, and the third flow channel 163 may have hexagonal cross-sectional shapes parallel to the radial and circumferential directions. In addition, as an example of the first porous heat dissipation element 140a in FIG. 8, the first flow channel 143a is cylindrical, while the second flow channel and the third flow channel in cylindrical shape are roughly similar to the first flow channel 143a in FIG. 8. Similarly, the cross-sectional shapes of the first flow channel 143a, the second flow channel, and the third flow channel parallel to the radial and circumferential directions can be circular. Please refer to FIGS. 2, 4, and 6 again. Because the shapes of the first flow channel 143, the second flow channel 153, and the third flow channel 163 can include hexagonal columns (or cylinders), therefore, the volume proportion of the first flow channels 143, the second flow channels 153, and the third flow channels 163 in the first porous heat dissipation element 140, the second porous heat dissipation element 150, and the third porous heat dissipation element 160 can be maximized respectively, thus improving the heat dissipation efficiency. Specifically, compared to the conventional heat dissipation element using fins, the heat dissipation area formed by the first flow channels 143 in the first porous heat dissipation element 140 can increase by about 20% or more. Similarly, the heat dissipation area formed by the second flow channels 153 in the second porous heat dissipation elements 150 can increase by about 20% or more, and the heat dissipation area formed by the third flow channels 163 in the third porous heat dissipation elements 160 can increase by about 20% or more, compared to the conventional fins. For example, in one embodiment, the heat dissipation areas formed by the first flow channels 143, the second flow channels 153 and the third flow channels 163 respectively in the first porous heat dissipation element 140, the second porous heat dissipation elements 150, and the third porous heat dissipation elements 160 can be approximately 200,000 to 220,000 mm$^2$. However, the heat dissipation elements of the same volume of the aforementioned conventional fins can only provide a heat dissipation area of at most about 160,000 mm$^2$. Therefore, it can be seen that under the same volume, the heat dissipation area formed by the porous heat dissipation element of the disclosure can increase {((200,000 to 220,000)−160,000)/(200,000 to 220,000)}*100%−20% to 27%, compared to the conventional fin heat dissipation area.

Please refer to FIGS. 2 and 3. The first flow channels 143 can be distributed in all the first porous heat dissipation element 140 in this embodiment, so that the volume proportion of the first flow channels 143 in the first porous heat dissipation element 140 can be maximized, thus further improving the heat dissipation efficiency. The first porous heat dissipation element 140 further includes an empty part 145 in this embodiment. The empty part 145 is, for example, an area for screw locking that can be used to fix the first porous heat dissipation element 140 with other elements. The disclosure does not impose any restrictions on the position of the screw locking. Please refer to FIGS. 4 and 5 again. Similarly, the second flow channels 153 can be distributed in all the second porous heat dissipation element 150 in this embodiment. The second porous heat dissipation element 150 further includes an empty part 155 in this embodiment. The empty part 155 is, for example, an area for screw locking that can be used to fix the second porous heat dissipation element 150 with other elements. The disclosure does not impose any restrictions on the position of the screw locking. Please refer to FIGS. 6 and 7. Similarly, the third flow channels 163 can be distributed in all the third porous heat dissipation element 160 in this embodiment. The third porous heat dissipation element 160 further includes an empty part 168 in this embodiment. The empty part 168 is, for example, an area for screw locking that can be used to fix the third porous heat dissipation element 160 with other elements. The disclosure does not impose any restrictions on the position of the screw locking.

Figure 9:
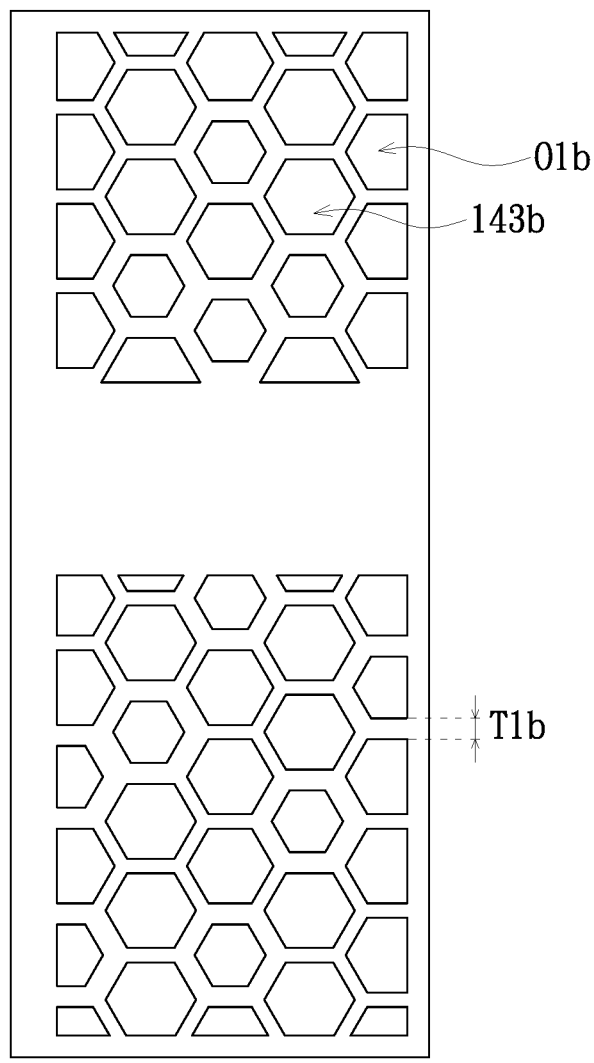
FIG. 9 is a schematic diagram of a first porous heat dissipation element in another embodiment of the disclosure.

Please refer to FIGS. 3, 5, and 7 together. In one embodiment, the wall thickness T1 of any one of the first flow channels 143, the wall thickness T2 of any one of the second flow channels 153, and the wall thickness T3 of any one of the third flow channels 163 are all less than 1.2 mm, for example. In this way, the volume proportion of the first flow channels 143 in the first porous heat dissipation element 140, the volume proportion of the second flow channels 153 in the second porous heat dissipation element 150, and the volume proportion of the third flow channel 163 in the third porous heat dissipation element 160 can be further increased, so that the first porous heat dissipation element 140, the second porous heat dissipation element 150, and the third porous heat dissipation element 160 have larger heat dissipation areas, and further improve the heat dissipation efficiency. For example, in one embodiment, the wall thickness T1 of the first flow channel 143, the wall thickness T2 of the second flow channel 153, and the wall thickness T3 of the third flow channel 163 are approximately 1 to 1.2 mm. However, for the conventional heat dissipation components of the same volume, the thickness of the fins is at least 1.45 mm. Please continue to refer to FIG. 3. Incidentally, the first flow channel 143 can penetrate the first porous heat dissipation element 140 to form a plurality of sidewalls W1, and the wall thickness T1 is, for example, the thickness of the sidewall W1 between any two adjacent first flow channels 143. The wall thickness T2 of the second flow channel 153 in FIG. 5 and the wall thickness T3 of the third flow channel 163 in FIG. 7 are roughly the same as that of the first flow channel 143 in FIG. 3, and no redundant detail is to be given herein. Please refer to FIGS. 3, 5 and 7 again. In this embodiment, the volumes of the first flow channels 143 can be the same as each other, the volumes of the second flow channels 153 can be the same as each other, and the volumes of the third flow channels 163 can be the same as each other. However, in one embodiment such as the first porous heat dissipation element 140b shown in FIG. 9, the volumes of the first flow channels 143b may differ from each other. Similarly, the volumes of the second flow channels may differ from each other, and the volumes of the third flow channels may differ from each other in one embodiment. FIG. 9 takes the first flow channel 143b as an example, and the features of the second flow channel and the third flow channel are roughly the same as those of the first flow channel 143b. In detail, the volume of the first flow channel 143b, the volume of the second flow channel, and the volume of the third flow channel can all vary depending on different flow fields or actual needs. For example, in one embodiment, the wall thickness T1b of part of the first flow channels 143b may be different from the wall thickness T1b of another part of the first flow channels 143b, so that the size of the opening O1b of part of the first flow channels 143b is different from the size of the opening O1b of another part of the first flow channels 143b. In another embodiment, the wall thickness T1b of the first flow channels 143b may differ from each other, so that the sizes of the openings O1b of the first flow channels 143b differ from each other; however, the disclosure does not impose any limitations on these details. It can be understood that the features of the second flow channels and the third flow channels are similar to those of the first flow channels 143b, and no redundant detail is to be given herein.

Please refer to FIGS. 3, 5, and 7 again. In this embodiment, it is to be noted that because the shape of the first flow channel 143, the shape of the second flow channel 153, and the shape of the third flow channel 163 can include hexagonal columns (or cylindrical columns), not only can the volume proportion of the first flow channels 143 in the first porous heat dissipation element 140, the volume proportion of the second flow channels 153 in the second porous heat dissipation element 150, and the volume proportion of the third flow channels 163 in the third porous heat dissipation element 160 be maximized, it can also enhance the structural strength of the first porous heat dissipation element 140, the second porous heat dissipation element 150, and the third porous heat dissipation element 160. In detail, compared to the conventional heat dissipation elements using fins, the wall thickness T1 of the first flow channel 143, the wall thickness T2 of the second flow channel 153, and the wall thickness T3 of the third flow channel 163 are smaller; however, the shape of the first flow channel 143, the shape of the second flow channel 153, and the shape of the third flow channel 163 can be cylindrical or hexagonal, so the first porous heat dissipation element 140, the second porous heat dissipation element 150, and the third porous heat dissipation element 160 can improve structural strength. For example, in one embodiment, the shape of the first flow channel 143, the shape of the second flow channel 153, and the shape of the third flow channel 163 may include hexagonal columns, and the wall thickness T1 of the first flow channel 143, the wall thickness T2 of the second flow channel 153, and the wall thickness T3 of the third flow channel 163 are, for example, approximately 1 mm. In another embodiment, the shape of the first flow channel 143, the shape of the second flow channel 153, and the shape of the third flow channel 163 may include cylindrical shapes, and the wall thickness T1 of the first flow channel 143, the wall thickness T2 of the second flow channel 153, and the wall thickness T3 of the third flow channel 163 are, for example, approximately 1.2 mm. It can be understood that the above values are only examples, and the disclosure does not impose any further limitations on them.

Please refer to FIG. 1 again. The first guide pipe 170 and the second guide pipe 180 can guide the airflow generated by the fan F to flow more concentrated through the first porous heat dissipation element 140, the second porous heat dissipation element 150, and the third porous heat dissipation element 160, thereby increasing the amount of the airflow flowing through the first porous heat dissipation element 140, the second porous heat dissipation element 150 and the third porous heat dissipation element 160. In this embodiment, the materials of the first guide pipe 170 and the second guide pipe 180 include, for example, plastic, which can reduce costs and slightly reduce the overall weight of the illumination device 100. Moreover, due to the non-heat conductive feature of the plastic material, the low heat conductive characteristic can block the heat generated by other components. The plastic may include mylar in one embodiment. Specifically, the mylar can be in the form of sheets and formed into pipes by adhesion or other means. On the other hand, plastic can form a pipe structure in one piece, and the disclosure does not impose any limitations on these details. In another embodiment, the materials of the first guide pipe 170 and the second guide pipe 180 may include metal to improve the heat dissipation efficiency. The metal may include the same material as the first porous heat dissipation element 140, the second porous heat dissipation element 150, and the third porous heat dissipation element 160, such as aluminum or copper, but other embodiments are not limited thereto. Incidentally, in this embodiment, the first guide pipe 170 can be fixed to the first porous heat dissipation element 140 and the third porous heat dissipation element 160 by adhesive means, and the second guide pipe 180 can also be fixed to the second porous heat dissipation element 150 and the third porous heat dissipation element 160 by adhesive means. In another embodiment, the first guide pipe 170 can be fixed with screws to the first porous heat dissipation element 140 and the third porous heat dissipation element 160, and the second guide pipe 180 can be fixed with screws to the second porous heat dissipation element 150 and the third porous heat dissipation element 160. However, the disclosure does not impose any limitations on the fixing method.

The first heat source 110, the second heat source 120, and the third heat source 130 each include a light source, for example. In this embodiment, the first heat source 110, the second heat source 120, and the third heat source 130 are a red light source, blue light source, and green light source, respectively. The red light source, blue light source, and green light source are configured to generate red, blue, and green beams, respectively. Further, the light source includes, for example, a laser diode (LD), wherein the quantity of the laser diodes can be one or more. For example, the quantity of the laser diodes is plural in one embodiment, and the laser diodes can be arranged into a matrix. The light source may include light-emitting diodes (LEDs) in another embodiment. Similarly, the quantity of the light-emitting diodes can be plural and arranged into a matrix.

Compared to the conventional technology, the illumination device 100 of this embodiment adopts a first porous heat dissipation element 140, a second porous heat dissipation element 150, and a third porous heat dissipation element 160 to dissipate heat from the first heat source 110, the second heat source 120, and the third heat source 130, respectively. Specifically, because the first porous heat dissipation element 140, the second porous heat dissipation element 150, and the third porous heat dissipation element 160 can provide sufficient heat dissipation area within a limited volume, the first porous heat dissipation element 140, the second porous heat dissipation element 150, and the third porous heat dissipation element 160 can be arranged more flexibly according to the heat dissipation needs of the heat source. In addition, the first porous heat dissipation element 140 and the third porous heat dissipation element 160 are connected by a first guide pipe 170, while the second porous heat dissipation element 150 and the third porous heat dissipation element 160 are connected by a second guide pipe 180. Further, the first guide pipe 170 and the second guide pipe 180 can prevent the airflow from escaping between the first porous heat dissipation element 140, the second porous heat dissipation element 150, and the third porous heat dissipation element 160, thereby increasing the amount of the airflow flowing through the first porous heat dissipation element 140, the second porous heat dissipation element 150, and the third porous heat dissipation element 160. Therefore, the illumination device 100 of this embodiment can improve the heat dissipation efficiency of the heat source in a limited space.

Figure 10:
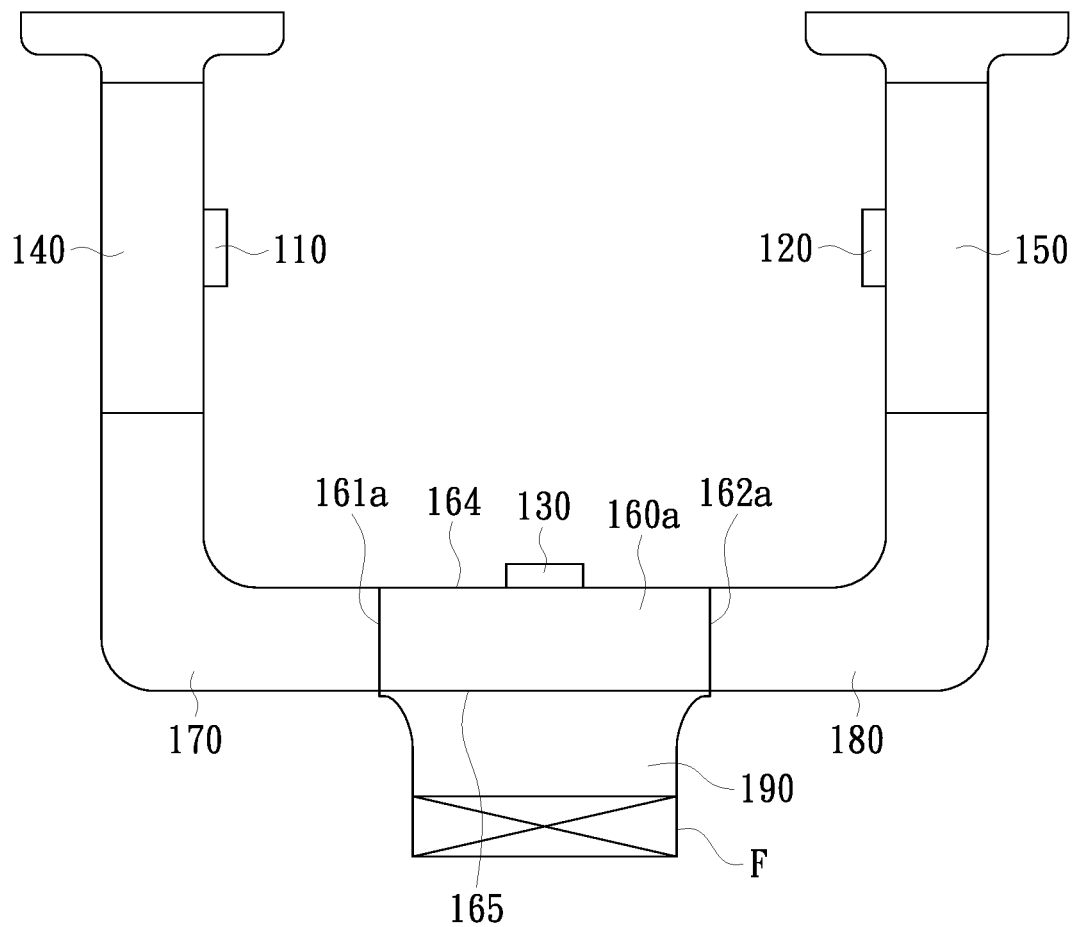
FIG. 10 is a schematic diagram of an illumination device in another embodiment of the disclosure.
Figure 11:
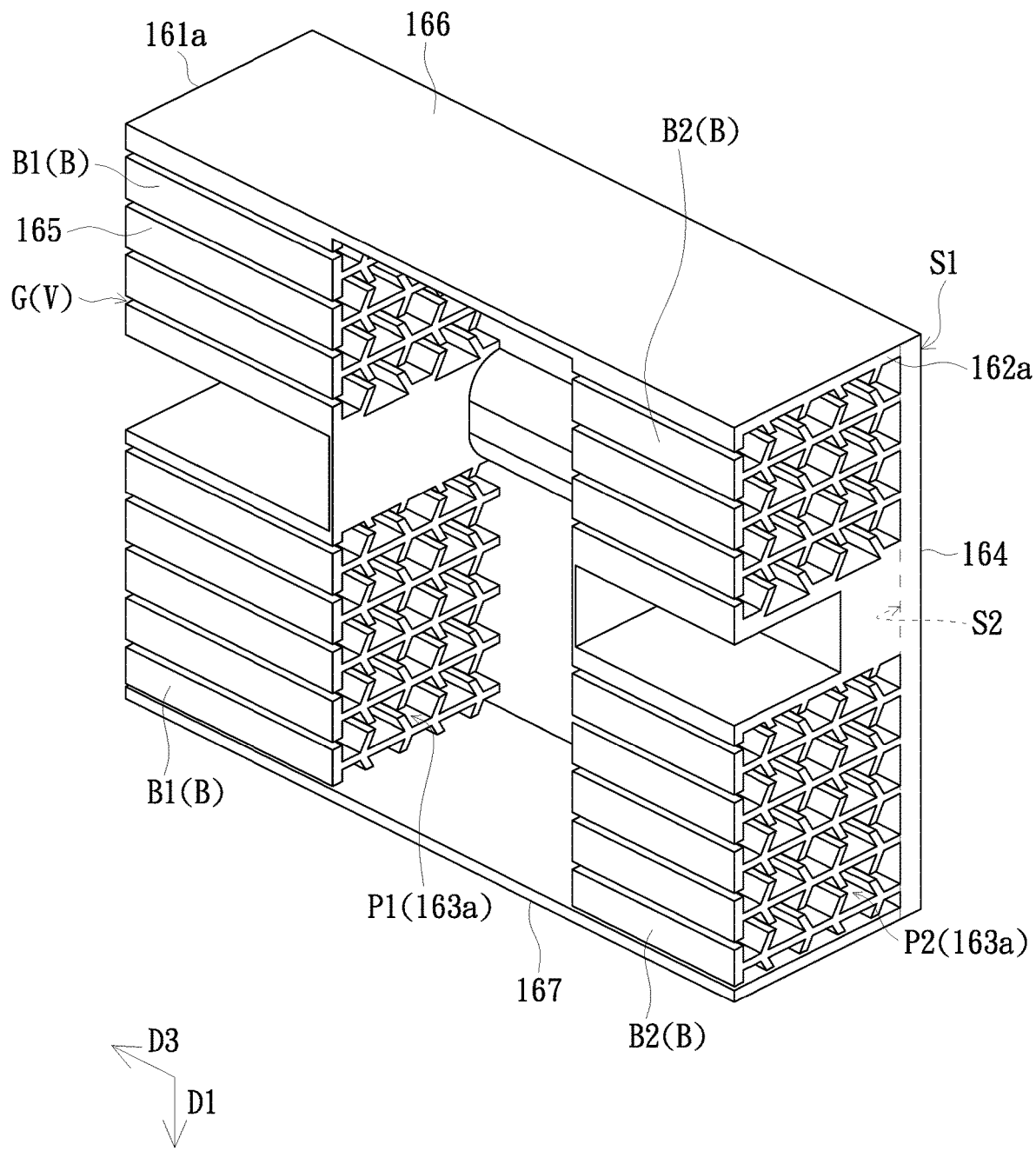
FIG. 11 is a three-dimensional schematic diagram of a third porous heat dissipation element in FIG. 10.
Figure 12:
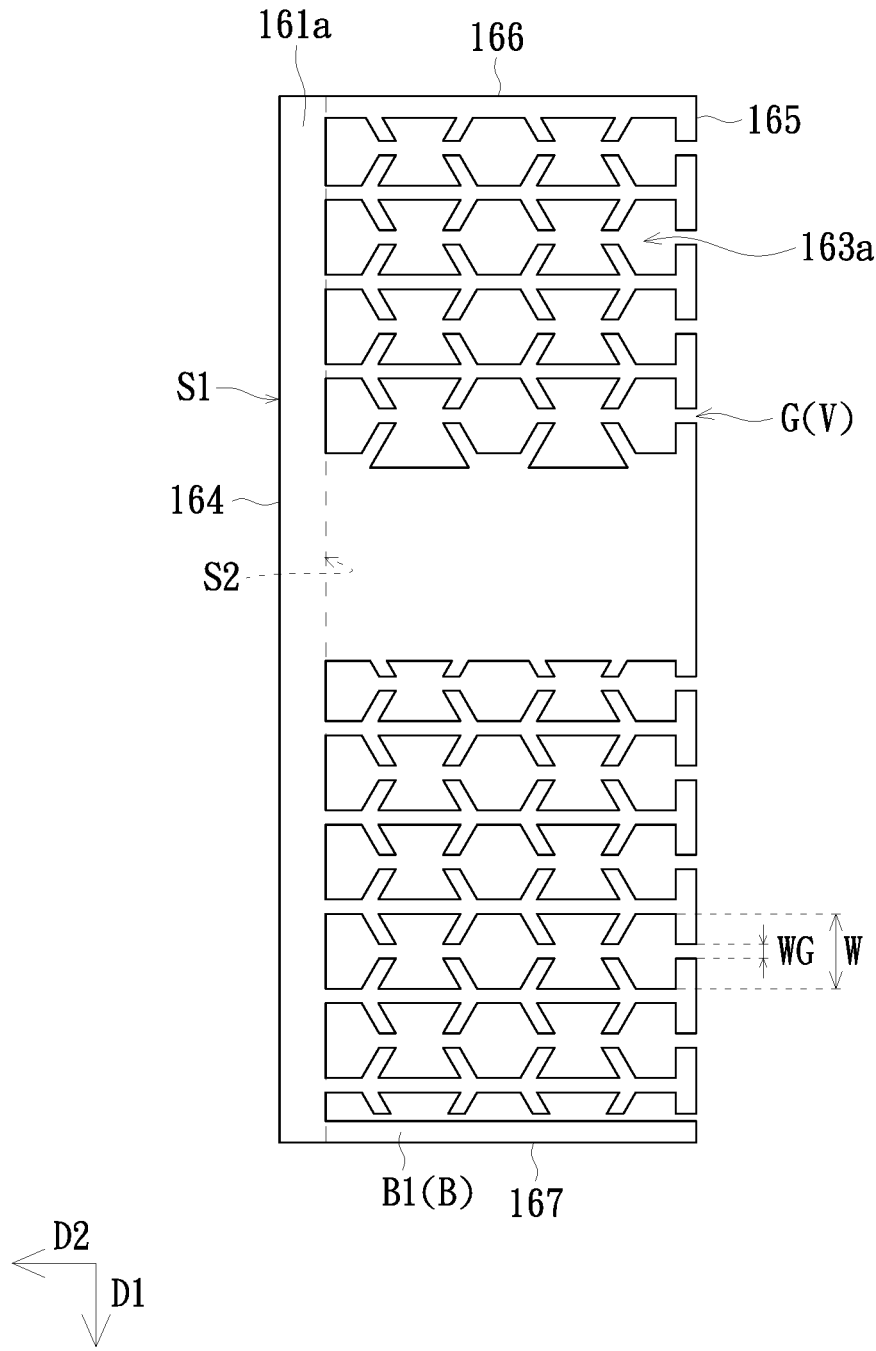
FIG. 12 is a schematic diagram of a fifth ventilation side of the third porous heat dissipation element of FIG. 11.

FIG. 10 is a schematic diagram of an illumination device in another embodiment of the disclosure. FIG. 11 is a three-dimensional schematic diagram of a third porous heat dissipation element in FIG. 10. FIG. 12 is a schematic diagram of a fifth ventilation side of the third porous heat dissipation element of FIG. 11. The structure and advantages of the illumination device 100b in this embodiment are similar to those of the embodiment in FIG. 1, and only the differences will be explained below. Please refer to FIG. 10 first. The first porous heat dissipation element 140 and the second porous heat dissipation element 150 are opposite to each other, and the third porous heat dissipation element 160a is located between the first porous heat dissipation element 140 and the second porous heat dissipation element 150. Please refer to FIGS. 11 and 12 together. The third porous heat dissipation element 160a may further have a seventh ventilation side 165 opposite to a third sidewall 164. The third sidewall 164 and the seventh ventilation side 165 are connected between the fifth ventilation side 161a and the sixth ventilation side 162a. The seventh ventilation side 165 has a plurality of ventilation openings V, and the ventilation openings V are communicated to the third flow channels 163a. In this way, the airflow can also flow out (or into) the third porous heat dissipation element 160a through the ventilation openings V, thereby improving the heat dissipation efficiency of the third porous heat dissipation element 160a to the third heat source 130 (shown in FIG. 10).

Please refer to FIGS. 10 and 11 together. In detail, the fan F can be arranged on the first ventilation side 141, the third ventilation side 151, and/or the seventh ventilation side 165. In this embodiment, the fan F is arranged on the seventh ventilation side 165 as an example. Further, the fan F can draw out the hot airflow in the third porous heat dissipation element 160a from the ventilation openings V in this embodiment, thereby improving the heat dissipation efficiency of the third porous heat dissipation element 160a to the third heat source 130. The fan F may provide cold airflow to the third porous heat dissipation element 160a from the ventilation openings V in another embodiment, and the disclosure does not impose any further restrictions on the airflow direction. The illumination device 100b of this embodiment may further include a third guide pipe 190, which is communicated to the fan F and the ventilation openings V. Specifically, the third guide pipe 190 can concentrate the airflow generated by the fan F, thus increasing the amount of the airflow flowing through the third guide pipe 190, and further improving the heat dissipation efficiency of the third porous heat dissipation element 160a to the third heat source 130. The fan F can also be arranged on the first ventilation side 141 and the third ventilation side 151 in another embodiment to further improve the heat dissipation efficiency of the illumination device 100b. It can be understood that the quantity of the fans F can be determined based on factors such as heat dissipation needs and product costs, so the disclosure does not impose any further restrictions on this. Incidentally, the fan F of this embodiment may include an axial flow fan, but the fan F may include a drum fan (blower) in other embodiments.

Please refer to FIGS. 11 and 12 again. In this embodiment, the third porous heat dissipation element 160a may further have a fourth sidewall 166 and a fifth sidewall 167 opposite to each other. The fourth sidewall 166 and the fifth sidewall 167 are connected between the fifth ventilation side 161a and the sixth ventilation side 162a, and are connected to the third sidewall 164 and the seventh ventilation side 165 to form an airflow space. For example, the ventilation openings V include a plurality of ventilation gaps G. The width WG (labeled in FIG. 12) of the ventilation gap G is smaller than the width W (labeled in FIG. 12) of the third flow channel 163a in the direction D1 from the fourth sidewall 166 to the fifth sidewall 167. In this way, the airflow flowing through the third flow channel 163a can be further increased, and the heat dissipation efficiency of the third porous heat dissipation element 160a can be further improved. Further, the ventilation gap G extends from the fifth ventilation side 161a to the sixth ventilation side 162a and can be communicated with the third flow channel 163a in the same row in the direction D2 (labeled in FIG. 12) from the seventh ventilation side 165 to the third wall 164. Therefore, the airflow in each third flow channel 163a can flow out of or enter the third porous heat dissipation element 160a through the ventilation gap G, thereby further improving the heat dissipation efficiency of the third porous heat dissipation element 160a.

Incidentally, the third sidewall 164 has a first surface S1 and a second surface S2 opposite to each other, for example. The third heat source 130 (depicted in FIG. 1) is arranged on the first surface S1. The fifth ventilation side 161a, the sixth ventilation side 162a, and the third flow channels 163a are located on all or part of the second surface S2. In this embodiment, the fifth ventilation side 161a, the sixth ventilation side 162a, and the third flow channels 163a are located on part of the second surface S2 as an example. Specifically, the third porous heat dissipation element 160a may have a heat dissipation block B. The fifth ventilation side 161a, the sixth ventilation side 162a, and the third flow channels 163a are located in the heat dissipation block B. The heat dissipation block B can be arranged on the second surface S2 and can cover all or part of the second surface S2. The third flow channels 163a may be located on part of the second surface S2 in this embodiment, that is, the heat dissipation block B can cover part of the second surface S2. Further, the third porous heat dissipation element 160a may include a first heat dissipation block B1 and a second heat dissipation block B2. The fifth ventilation side 161a and part of the third flow channels 163a are located in the first heat dissipation block B1, while the sixth ventilation side 162a and another part of the third flow channels 163a are located in the second heat dissipation block B2. The first heat dissipation block B1 and the second heat dissipation block B2 are separated from each other in the direction D3 (labeled in FIG. 11) from the sixth ventilation side 162a to the fifth ventilation side 161a. In detail, the third flow channel 163a can include a first section P1 and a second section P2. The first section P1 is located in the first heat dissipation block B1 and connected to the fifth ventilation side 161a, while the second section P2 is located in the second heat dissipation block B2 and connected to the sixth ventilation side 162a, for example. In this embodiment, the second section P2 and the first section P1 are separated from each other and communicated with each other. The airflow generated by the fan F can flow out of the ventilation gap G or enter the third flow channel 163a, and can also flow out of or enter the third flow channel 163a through the space formed between the second section P2 and the first section P1. In addition, part of the second surface S2 can be exposed from the first heat dissipation block B1 and the second heat dissipation block B2, which are separated from each other, to provide space for screw locking. However, the heat dissipation block B can cover all the second surface S2 in an embodiment, thereby further improving the heat dissipation efficiency of the third porous heat dissipation element 160a.

Please refer to FIG. 10 again. Incidentally, the first heat source 110, the second heat source 120, and the third heat source 130 in this embodiment can each include a light source, and the light source of the third heat source 130 is configured to generate a green beam. Specifically, the first heat source 110, the second heat source 120, and the third heat source 130 are, for example, a red light source, a blue light source, and a green light source, respectively. The green light source generates more thermal energy than the red and blue light sources. Therefore, the third porous heat dissipation element 160a can be used to enhance the heat dissipation of the third heat source 130 in this embodiment. The first heat source 110 may be a red light source, and the second heat source 120 may be a blue light source in one embodiment, but the disclosure is not limited thereto. The features of red light sources, blue light sources, and green light sources have been described above, and no redundant detail is to be given herein.

Figure 13:
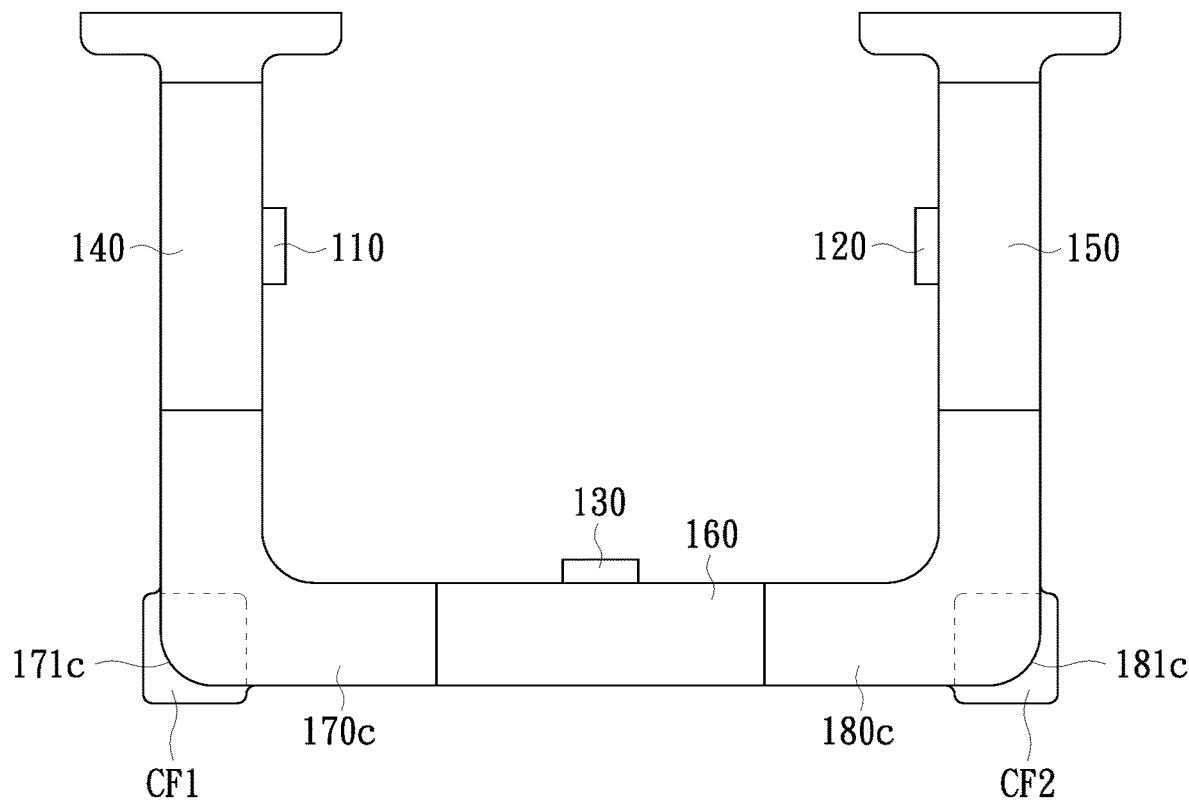
FIG. 13 is a schematic diagram of an illumination device in another embodiment of the disclosure.
Figure 14:
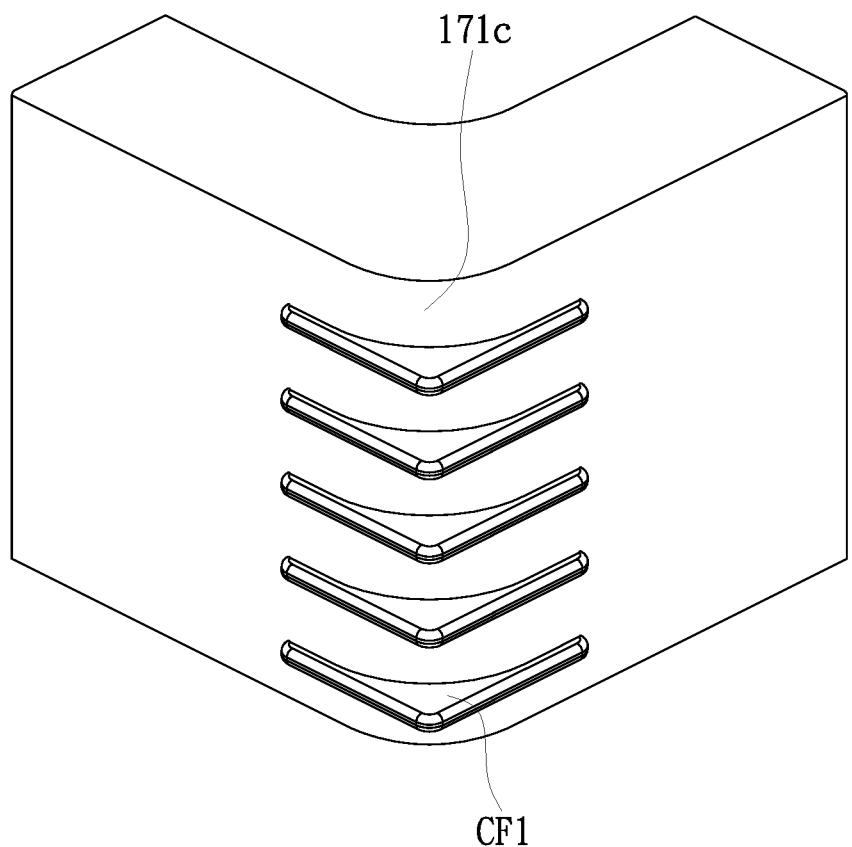
FIG. 14 is a three-dimensional schematic diagram of a first guide pipe in FIG. 13.

FIG. 13 is a schematic diagram of an illumination device in another embodiment of the disclosure. FIG. 14 is a three-dimensional schematic diagram of a first guide pipe in FIG. 13. The structure and advantages of the illumination device 100c in this embodiment are similar to those of the embodiment in FIG. 1, and only the differences will be explained below. Please refer to FIGS. 13 and 14 first. The first guide pipe 170c may have a bending part 171c, while the second guide pipe 180c may have a bending part 181c. The bending part 171c can have a plurality of heat dissipation fins CF1, and the heat dissipation fins CF1 are arranged to penetrate the bending part 171c. Similarly, please continue to refer to FIG. 13. The bending part 181c can have a plurality of heat dissipation fins CF2, and the heat dissipation fins CF2 are arranged to penetrate the bending part 181c. In detail, because the flow rate of the airflow flowing through the bending parts 171c and 181c is low, the bending parts 171c and 181c are easy to accumulate heat energy, so the heat dissipation fins CF1 and CF2 can be used to improve the heat dissipation efficiency. Furthermore, the heat dissipation fin CF1 can penetrate the bending part 171c of the first guide pipe 170c and extend into the first guide pipe 170c. Similarly, the heat dissipation fin CF2 can penetrate the bending part 181c of the second guide pipe 180c and extend into the second guide pipe 180c to improve the heat dissipation efficiency. In one embodiment, the heat dissipation fin CF1 can be first formed by die casting and then arranged at the bending part 171c. The process of arranging the heat dissipation fin CF2 at the bending part 181c is similar to that of the heat dissipation fin CF1, and no redundant detail is to be given herein. In another embodiment, the heat dissipation fin CF1 can be integrated with the first guide pipe 170c, while the heat dissipation fin CF2 can be integrated with the second guide pipe 180c; however, the disclosure is not limited thereto.

Figure 15:
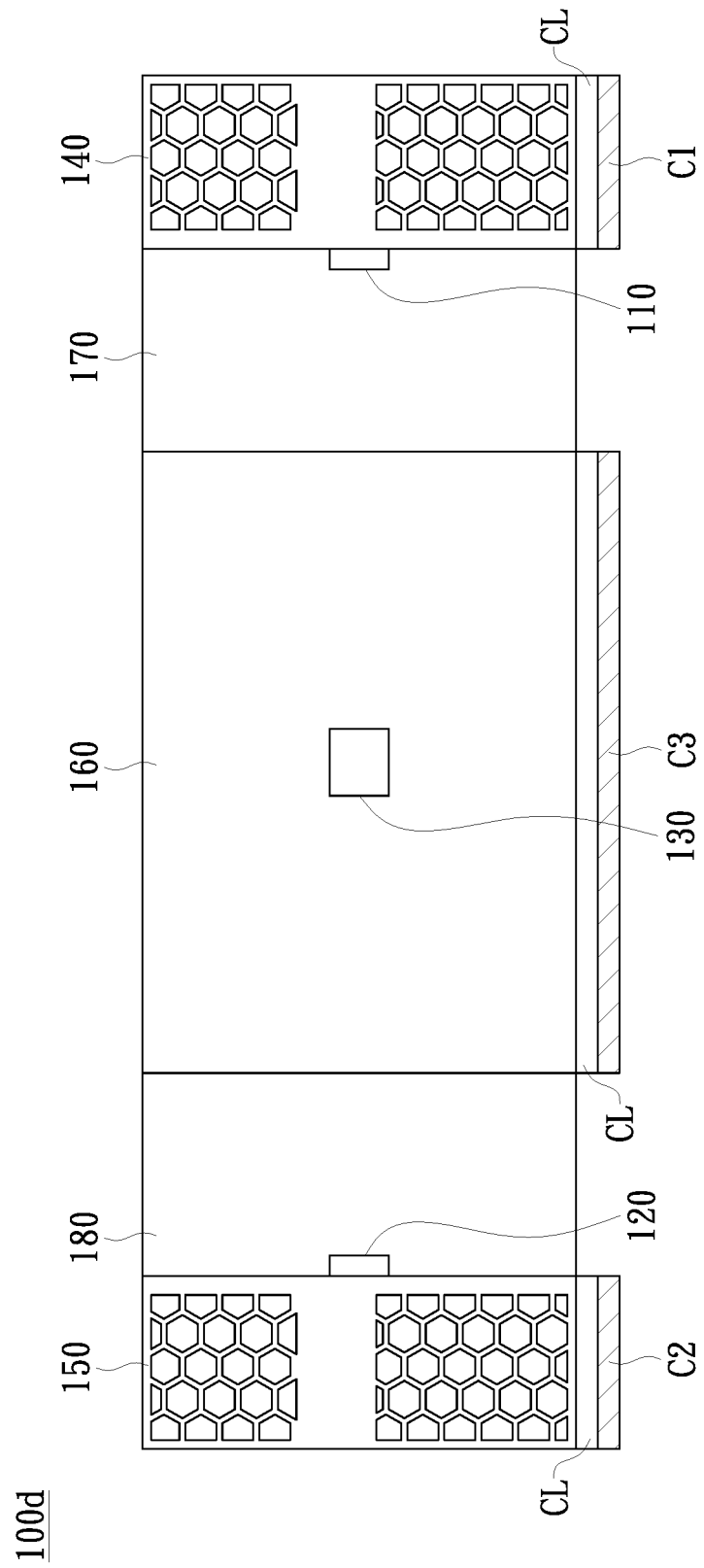
FIG. 15 is a schematic diagram of an illumination device in another embodiment of the disclosure.

FIG. 15 is a schematic diagram of an illumination device in another embodiment of the disclosure. The structure and advantages of the illumination device 100d in this embodiment are similar to those in the embodiment of FIG. 1, and only the differences will be explained below. Please refer to FIG. 15. The illumination device 100d may further include a first heat conductive member C1, a second heat conductive member C2, a third heat conductive member C3, and a heat conductive layer CL. The first heat conductive member C1 is fixed to the first porous heat dissipation element 140. The second heat conductive member C2 is fixed to the second porous heat dissipation element 150. The third heat conductive member C3 is fixed to the third porous heat dissipation element 160. The heat conductive layer CL is arranged between the first heat conductive member C1 and the first porous heat dissipation element 140, between the second heat conductive member C2 and the second porous heat dissipation element 150, and between the third heat conductive member C3 and the third porous heat dissipation element 160. In this way, the heat energy accumulated in the first porous heat dissipation element 140, the second porous heat dissipation element 150, and the third porous heat dissipation element 160 can be more quickly transferred to the first heat conductive member C1, the second heat conductive member C2, and the third heat conductive member C3 through the heat conductive layer CL, thereby further improving the heat dissipation efficiency. Specifically, the materials of the first heat conductive member C1, the second heat conductive member C2, and the third heat conductive member C3 may include metals. Further, the first heat conductive member C1, the second heat conductive member C2, and the third heat conductive member C3 are, for example, sheet metal members. In addition, the first porous heat dissipation element 140, the second porous heat dissipation element 150, and the third porous heat dissipation element 160 can be fixed to different heat conductive members in this embodiment. However, the first porous heat dissipation element 140, the second porous heat dissipation element 150, and the third porous heat dissipation element 160 can be fixed to the same heat conductive member in another embodiment. In this embodiment, the heat conductive layer CL may include a thermal pad or thermal paste. Furthermore, the material of the heat conductive layer CL may include silicone adhesive in one embodiment, but the disclosure does not impose any specific limitations on the specific material of the heat conductive layer CL. Incidentally, the materials of the first guide pipe 170 and the second guide pipe 180 can be metals, while the first guide pipe 170 and the second guide pipe 180 can be fixed to the heat conductive member through the heat conductive layer CL in another embodiment, thereby further improving the heat dissipation efficiency.

Figure 16:
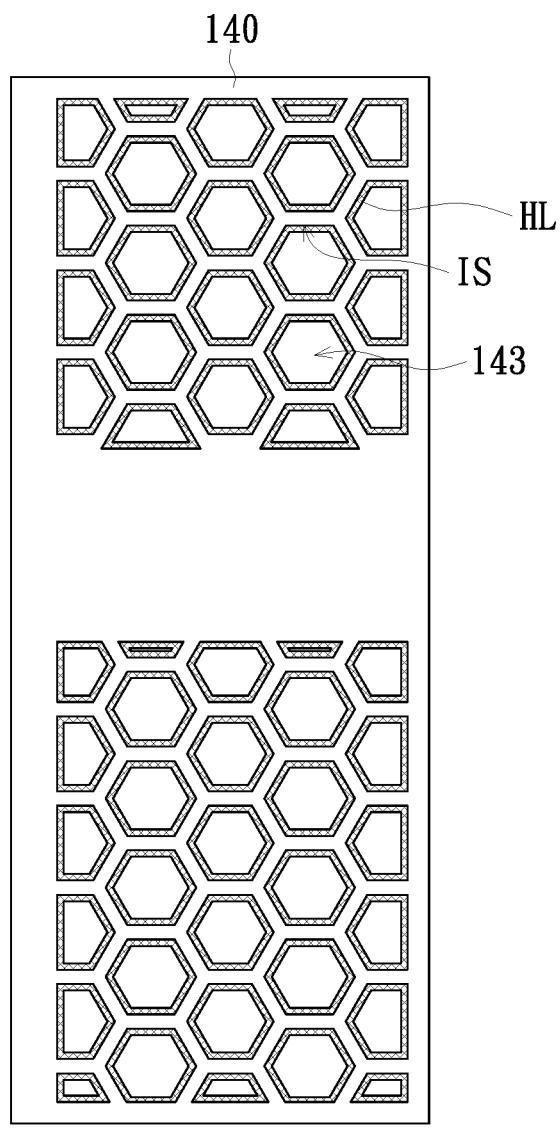
FIG. 16 is a schematic diagram of a part of an illumination device in another embodiment of the disclosure.
Figure 17:
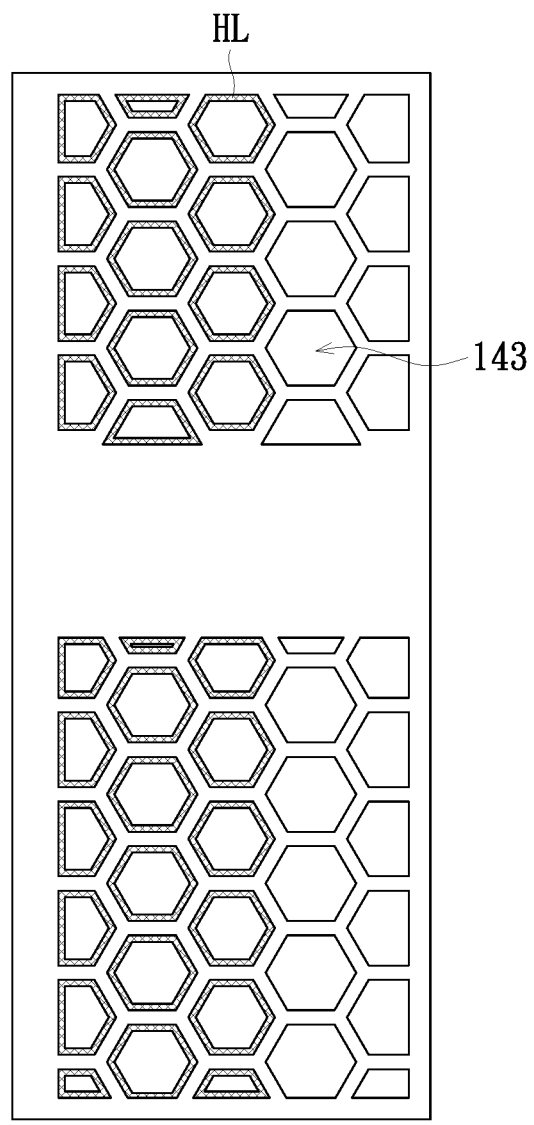
FIG. 17 is a schematic diagram of a first porous heat dissipation element in another embodiment of the disclosure.

FIG. 16 is a schematic diagram of a part of an illumination device in another embodiment of the disclosure. FIG. 17 is a schematic diagram of a first porous heat dissipation element in another embodiment of the disclosure. The structure and advantages of the illumination device 100e in this embodiment are similar to those in the embodiment of FIG. 1, and only the differences will be explained below. The illumination device 100e further includes a heat dissipation layer HL, for example. Please refer to FIG. 16 first. The heat dissipation layer HL can be arranged in all the first flow channels 143, all the second flow channels, and all the third flow channels to further improve the heat dissipation efficiency. It should be noted that FIG. 16 is an example in which the heat dissipation layer HL is arranged in the first flow channels 143, and the features of arranging the heat dissipation layer HL in the second flow channels and the third flow channels are roughly the same as those shown in FIG. 16. Specifically, the first flow channel 143 penetrates through the first porous heat dissipation element 140 to form an inner side IS, and the heat dissipation layer HL can be arranged on the inner side IS. Further, the heat dissipation layer HL can pass through the first flow channel 143 through the siphon principle and adhere to the inner side IS when passing through the first flow channel 143. The process of arranging the heat dissipation layer HL in the second and third flow channels is roughly similar to that in the first flow channel 143, and no redundant detail is to be given herein. The material of the heat dissipation layer HL may include graphene in one embodiment, but the disclosure is not limited thereto. In another embodiment as shown in FIG. 17, the heat dissipation layer HL can be arranged in part of the first flow channels 143, part of the second flow channels, and part of the third flow channels, wherein FIG. 17 takes the first flow channel 143 as an example. Thus, the time required to arrange the heat dissipation layer HL can be shortened. Further, part of the first flow channels 143 can be covered by the mold first, and then the process of arranging the heat dissipation layer HL can be carried out. The process of arranging the heat dissipation layer HL in the second and third flow channels is similar to that in the first flow channels 143, and no redundant detail is to be given herein.

Figure 18:
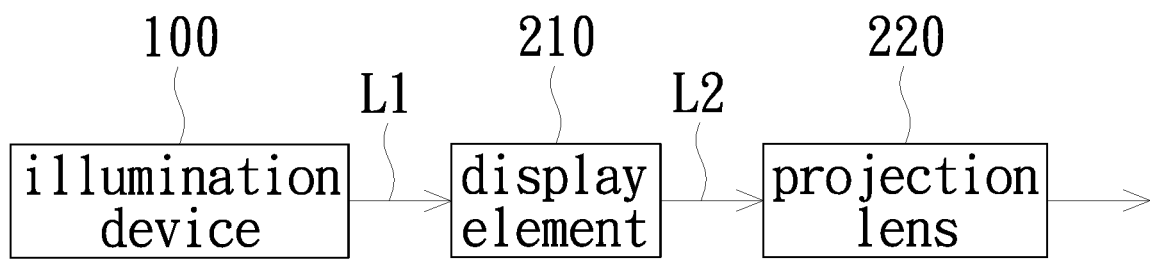
FIG. 18 is a block diagram of a projection device according to an embodiment of the disclosure.

FIG. 18 is a block diagram of a projection device according to an embodiment of the disclosure. Please refer to FIG. 18. The illumination devices 100, 100b, 100c, 100d, and 100e of the above embodiments can all be applied to the projection device 200, while this embodiment takes the illumination device 100 as an example. The projection device 200 includes an illumination device 100, a display element 210, and a projection lens 220. The illumination device 100 is configured to provide at least one of the red beam, blue beam, and green beam. At least one of the red, blue, and green beams is defined as an illumination beam L1. That is, the illumination device 100 is configured to provide the illumination beam L1.

The display element 210 is located on the transmission path of the illumination beam L1 and is configured to receive the illumination beam L1 and convert the illumination beam L1 into an image beam L2. The projection lens 220 is located on the transmission path of the image beam L2 and is configured to project the image beam L2 onto a projection target. The aforementioned projection targets are, for example, walls, desktops, or projection screens. The display element 210 is, for example, a light valve, which is a reflective light modulator such as a digital micro-mirror device (DMD) or liquid crystal on a silicon panel (LCOS panel). In some embodiments, the light valve can be a transmission light modulator such as a transmission liquid crystal display panel, an electro-optical modulator, a magneto-optic modulator, and an acousto-optic modulator (AOM). It is understood that the display element 210 can also be other optical imaging elements, and the disclosure is not limited thereto. The projection lens 220 includes, for example, various combinations of one or more non-planar optical lenses with refractive power, such as biconvex lenses, biconcave lenses, concave-convex lenses, planar convex lenses, and planar concave lenses. In one embodiment, the projection lens 220 may also include a planar optical lens that projects the image beam L2 out of the projection device 200 in a reflective or penetrating manner.

Compared with the conventional technology, because the projection device 200 in this embodiment uses the illumination device 100, the projection device 200 can improve the heat dissipation efficiency in a limited space, and thus improve the durability and image quality.

In summary, the illumination device of the disclosure adopts a first porous heat dissipation element, a second porous heat dissipation element, and a third porous heat dissipation element to dissipate heat from the first heat source, the second heat source, and the third heat source, respectively. Specifically, because the first porous heat dissipation element, the second porous heat dissipation element, and the third porous heat dissipation element can provide sufficient heat dissipation area within a limited volume, the first porous heat dissipation element, the second porous heat dissipation element, and the third porous heat dissipation element can be arranged more flexibly according to the heat dissipation needs of the heat source. In addition, the first porous heat dissipation element and the third porous heat dissipation element are connected by a first guide pipe, while the second porous heat dissipation element and the third porous heat dissipation element are connected by a second guide pipe. Further, the first guide pipe and the second guide pipe can prevent the airflow from escaping between the first porous heat dissipation element, the second porous heat dissipation element, and the third porous heat dissipation element, thereby increasing the amount of the airflow flowing through the first porous heat dissipation element, the second porous heat dissipation element, and the third porous heat dissipation element. Therefore, the illumination device and the projection device of the disclosure can improve the heat dissipation efficiency of the heat source in a limited space, and thus improve the durability and image quality of the projection device.

The foregoing description of the preferred embodiment of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure" is not necessary limited the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. An illumination device, comprising:
   a first heat source, a second heat source, and a third heat source;
   a first porous heat dissipation element, connected to the first heat source and having a first ventilation side, a second ventilation side, and a plurality of first flow channels, wherein the first ventilation side is opposite to the second ventilation side, and the plurality of first flow channels extend from the first ventilation side to the second ventilation side;
   a second porous heat dissipation element, connected to the second heat source and having a third ventilation side, a fourth ventilation side, and a plurality of second flow channels, wherein the third ventilation side is opposite to the fourth ventilation side, and the plurality of second flow channels extend from the third ventilation side to the fourth ventilation side;
   a third porous heat dissipation element, connected to the third heat source and having a fifth ventilation side, a sixth ventilation side, and a plurality of third flow channels, wherein the fifth ventilation side is opposite to the sixth ventilation side, and the plurality of third flow channels extend from the fifth ventilation side to the sixth ventilation side;
a first guide pipe, connected to the second ventilation side and the fifth ventilation side and communicated to the plurality of first flow channels and the plurality of third flow channels; and
a second guide pipe, connected to the fourth ventilation side and the sixth ventilation side and communicated to the plurality of second flow channels and the plurality of third flow channels.

2. The illumination device according to claim 1, wherein the first porous heat dissipation element further has a plurality of first sidewalls, the plurality of first sidewalls are located between the first ventilation side and the second ventilation side, the second porous heat dissipation element further has a plurality of second sidewalls, the plurality of second sidewalls are located between the third ventilation side and the fourth ventilation side, and the third porous heat dissipation element further has a plurality of third sidewalls, and the plurality of third sidewalls are located between the fifth ventilation side and the sixth ventilation side.

3. The illumination device according to claim 2, wherein the first heat source, the second heat source, and the third heat source each comprise a light source, and the light source of the third heat source is configured to generate a green beam.

4. The illumination device according to claim 1, wherein the first porous heat dissipation element is opposite to the second porous heat dissipation element, the third porous heat dissipation element is located between the first porous heat dissipation element and the second porous heat dissipation element, the third porous heat dissipation element further has a third sidewall and a seventh ventilation side opposite to each other, the third sidewall and the seventh ventilation side are connected between the fifth ventilation side and the sixth ventilation side, the seventh ventilation side has a plurality of ventilation openings, and the plurality of ventilation openings are communicated with the plurality of third flow channels.

5. The illumination device according to claim 4, wherein the third porous heat dissipation element further has a fourth sidewall and a fifth sidewall opposite to each other, fourth sidewall and the fifth sidewall are connected between the fifth ventilation side and the sixth ventilation side and connected to the third sidewall and the seventh ventilation side to form an airflow space, the plurality of ventilation openings comprise a plurality of ventilation gaps, and a width of the plurality of ventilation gap is smaller than a width of the plurality of third flow channel in a direction from the fourth sidewall to the fifth sidewall.

6. The illumination device according to claim 4, wherein the third sidewall has a first surface and a second surface opposite to each other, the third heat source is arranged on the first surface, and the fifth ventilation side, the sixth ventilation side, and the plurality of third flow channels are located on all or part of the second surface.

7. The illumination device according to claim 6, wherein the plurality of third flow channels are located on part of the second surface, the third porous heat dissipation element comprises a first heat dissipation block and a second heat dissipation block, the fifth ventilation side and part of the plurality of third flow channels are located in the first heat dissipation block, the sixth ventilation side and another part of the plurality of third flow channels are located in the second heat dissipation block, and the first heat dissipation block and the second heat dissipation block are separated from each other in a direction from the fifth ventilation side to the sixth ventilation side.

8. The illumination device according to claim 4, further comprising a fan, arranged on the first ventilation side, the third ventilation side, and/or the seventh ventilation side.

9. The illumination device according to claim 8, further comprising a third guide pipe, wherein the fan is at least arranged on the seventh ventilation side, and the third guide pipe is communicated with the fan and the plurality of ventilation openings.

10. The illumination device according to claim 1, further comprising a fan, arranged on the first ventilation side and/or the third ventilation side.

11. The illumination device according to claim 1, wherein the first heat source, the second heat source, and the third heat source each comprise a light source.

12. The illumination device according to claim 1, wherein the first guide pipe and the second guide pipe each have a bending part, and the bending parts each have a plurality of heat dissipation fins, and the plurality of heat dissipation fins are arranged to penetrate the bending parts, respectively.

13. The illumination device according to claim 1, wherein shapes of the plurality of first flow channel, the plurality of second flow channel, and the plurality of third flow channel comprise cylindrical or hexagonal columns.

14. The illumination device according to claim 13, wherein the plurality of first flow channels are distributed within all the first porous heat dissipation element, the plurality of second flow channels are distributed within all the second porous heat dissipation element, and the plurality of third flow channels are distributed within all the third porous heat dissipation element.

15. The illumination device according to claim 1, further comprising a heat dissipation layer, wherein the heat dissipation layer is arranged in all the plurality of first flow channels, all the plurality of second flow channels, and all the plurality of third flow channels, or in some of the plurality of first flow channels, some of the plurality of second flow channels, and some of the plurality of third flow channels.

16. The illumination device according to claim 1, wherein materials of the first guide pipe and the second guide pipe comprise metal or plastic.

17. The illumination device according to claim 1, further comprising a first heat conductive member, a second heat conductive member, a third heat conductive member, and a heat conductive layer, wherein the first heat conductive member is fixed to the first porous heat dissipation element, the second heat conductive member is fixed to the second porous heat dissipation element, the third heat conductive member is fixed to the third porous heat dissipation element, the heat conductive layer is arranged between the first heat conductive member and the first porous heat dissipation element, between the second heat conductive member and the second porous heat dissipation element, and between the third heat conductive member and the third porous heat dissipation element.

18. The illumination device according to claim 1, wherein volumes of the plurality of first flow channels are different from each other, volumes of the plurality of second flow channels are different from each other, and volumes of the plurality of third flow channels are different from each other.

19. A projection device, comprising:
an illumination device, a display element, and a projection lens, wherein the illumination device is configured to provide an illumination beam, and the illumination device comprises:
a first heat source, a second heat source, and a third heat source;
a first porous heat dissipation element, connected to the first heat source and having a first ventilation side, a second ventilation side, and a plurality of first flow channels, wherein the first ventilation side is opposite to the second ventilation side, and the plurality of first flow channels extend from the first ventilation side to the second ventilation side;
a second porous heat dissipation element, connected to the second heat source and having a third ventilation side, a fourth ventilation side, and a plurality of second flow channels, wherein the third ventilation side is opposite to the fourth ventilation side, and the plurality of second flow channels extend from the third ventilation side to the fourth ventilation side;
a third porous heat dissipation element, connected to the third heat source and having a fifth ventilation side, a sixth ventilation side, and a plurality of third flow channels, wherein the fifth ventilation side is opposite to the sixth ventilation side, and the plurality of third flow channels extend from the fifth ventilation side to the sixth ventilation side;
a first guide pipe, connected to the second ventilation side and the fifth ventilation side and communicated to the plurality of first flow channels and the plurality of third flow channels; and
a second guide pipe, connected to the fourth ventilation side and the sixth ventilation side and communicated to the plurality of second flow channels and the plurality of third flow channels;
the display element is located on a transmission path of the illumination beam and is configured to receive the illumination beam and convert the illumination beam into an image beam; and
the projection lens is located on a transmission path of the image beam and is configured to project the image beam out of the projection device.

* * * * *